(12) United States Patent
Lee et al.

(10) Patent No.: US 12,045,281 B2
(45) Date of Patent: Jul. 23, 2024

(54) METHOD AND APPARATUS FOR PROVIDING USER INTERFACE FOR VIDEO RETRIEVAL

(71) Applicant: Twelve Labs, Inc., Seattle, WA (US)

(72) Inventors: Seung Joon Lee, Seoul (KR); Haram Jo, Jeollanam-do (KR); Eunkyung Yoon, Seoul (KR); Soyoung Lee, Seoul (KR); Jae Sung Lee, Seoul (KR)

(73) Assignee: Twelve Labs, Inc., Seattle, WA (US)

(*) Notice: Subject to any disclaimer, the term of this patent is extended or adjusted under 35 U.S.C. 154(b) by 0 days.

(21) Appl. No.: 17/985,115

(22) Filed: Nov. 10, 2022

(65) Prior Publication Data

US 2024/0070197 A1    Feb. 29, 2024

Related U.S. Application Data

(60) Provisional application No. 63/402,391, filed on Aug. 30, 2022.

(51) Int. Cl.
*G06F 16/70* (2019.01)
*G06F 16/738* (2019.01)
*G06F 16/783* (2019.01)

(52) U.S. Cl.
CPC .......... *G06F 16/738* (2019.01); *G06F 16/784* (2019.01); *G06F 16/7844* (2019.01)

(58) Field of Classification Search
CPC ... G06F 16/738; G06F 16/7844; G06F 16/784
See application file for complete search history.

(56) References Cited

U.S. PATENT DOCUMENTS

| | | | | |
|---|---|---|---|---|
| 7,933,338 | B1* | 4/2011 | Choudhry | G06F 16/70 375/240.26 |
| 8,560,533 | B1* | 10/2013 | He | G06F 16/9535 707/727 |
| 11,461,393 | B1* | 10/2022 | Jain | G06F 16/7837 |
| 2007/0203942 | A1* | 8/2007 | Hua | G11B 27/34 |
| 2012/0210220 | A1* | 8/2012 | Pendergast | G06F 3/0482 715/716 |

(Continued)

OTHER PUBLICATIONS

Article entitled "RePlay: Contextually Presenting Learning Videos Across Software Applications", by Fraser et al., dated May 9, 2019 (Year: 2019).*

(Continued)

*Primary Examiner* — Mahesh H Dwivedi
(74) *Attorney, Agent, or Firm* — Fenwick & West LLP

(57) ABSTRACT

Provided is a method of providing a user interface for video retrieval performed by a computing device, the method including: receiving a search query, providing a search result interface displaying at least one search video content and search section searched by the search query, wherein the search video content and the search section are related with at least one of a plurality of video semantic search attributes corresponding to the search query, and providing a timeline view interface for the search video content when it is determined to display the search result interface according to a timeline view mode, wherein the timeline view interface has a visual characteristic indicating the degree of relevance to at least one of the plurality of video semantic search attributes corresponding to the search query.

19 Claims, 15 Drawing Sheets

(56) References Cited

U.S. PATENT DOCUMENTS

| | | | | |
|---|---|---|---|---|
| 2013/0166587 | A1* | 6/2013 | Berry | G06F 16/489 |
| | | | | 707/769 |
| 2014/0372424 | A1* | 12/2014 | Markov | G06F 16/745 |
| | | | | 707/725 |
| 2018/0084023 | A1* | 3/2018 | Stoop | H04L 65/762 |
| 2018/0307383 | A1* | 10/2018 | Faulkner | H04N 7/155 |
| 2021/0193187 | A1* | 6/2021 | Phillips | G06V 20/41 |
| 2022/0308742 | A1* | 9/2022 | Ziv | G06F 16/784 |
| 2023/0029278 | A1* | 1/2023 | Parush Tzur | G06F 16/7328 |

OTHER PUBLICATIONS

Article entitled "Semantically Enabled Exploratory Video Search", by Waitelonis et al., dated Apr. 30, 2010 (Year: 2010).*

Article entitled "Interactive Search in Large Video Collections", by Girgensohn et al., dated Apr. 7, 2005 (Year: 2005).*

* cited by examiner

METHOD AND APPARATUS FOR PROVIDING USER INTERFACE FOR VIDEO RETRIEVAL

CROSS-REFERENCE TO RELATED APPLICATIONS

The present application claims the benefit of U.S. Provisional Application No. 63/402,391, filed on Aug. 30, 2022, the disclosure of which is incorporated by reference herein in its entirety.

RELATED FIELD

The present disclosure relates to a computer technology field, and more particularly, to a method and an apparatus for providing a user interface suitable for video retrieval.

BACKGROUND

Video data is an important data storage method that accounts for 80% of the currently generated world's data. Video data has the characteristic of atypical multi-modal data including not only visual data, but also non-visual data, such as audio data, text data, and semantic data according to the interaction of objects in the video.

Video Corpus Moment Retrieval (VCMR) is a technology that understands video data like a human and accurately finds scenes that match a given sentence, and is attracting attention as a key technology in the field of next-generation artificial general intelligence research. Compared to video retrieval technology, the VCMR technology may additionally output even a start time and an end time of a section to be searched in a single video.

Recently, the VCMR technology uses voice information and temporal context information in addition to visual information. Accordingly, there is a demand for a user interface suitable for a video retrieval technology capable of comprehensively recognizing and processing a variety of information including visual information, voice information, and temporal context information.

SUMMARY

The present disclosure has been conceived in response to the foregoing background art, and has been made in an effort to provide a method and an apparatus for providing a user interface for video retrieval.

In order to solve the foregoing problem, an exemplary embodiment of the present disclosure discloses a method of providing a user interface for video retrieval performed by a computing device, the method including receiving a search query, providing a search result interface displaying at least one search video content and one or more search sections within the search video content retrieved as a result of the search query, in which the search video content and the one or more search sections are related with the search query with respect to at least one of a plurality of video semantic search attributes, and providing a timeline view interface for the search video content when providing the search result interface in a timeline view mode, wherein the timeline view interface indicates locations of the one or more search sections of the search video content along a timeline of the search video content, and wherein the timeline view interface has a visual characteristic indicating a degree of relevance of the one or more search sections with respect to the at least one of the plurality of video semantic search attributes for the search query.

In one embodiment, the plurality of video semantic search attributes may include at least one of conversation information in a video, text information in a video, person information in a video, and visual information in a video.

In one embodiment, the visual characteristic may include a color characteristic indicating the degree of relevance.

In one embodiment, the visual characteristic may include at least one of a color characteristic, a sign, or text indicating the degree of relevance.

In one embodiment, the method may further include providing a search attribute information display interface indicating video semantic search attribute information corresponding to a position of a scroll marker on the timeline view interface.

In one embodiment, the search attribute information display interface may include at least one of a video semantic search thumbnail display area, a video semantic search type display area, and a video semantic search content display area.

In one embodiment, the method may further include providing a video playback interface including a playback area for playing the search video content and a playback control interface for the search video content.

In one embodiment, the method may further include providing a filtering setting interface for the search video content, and responsive to receiving a filtering input for selecting at least one of the plurality of video semantic search attributes through the filtering setting interface, displaying the search video content related to the selected video semantic search attribute on the search result interface.

In one embodiment, the method may further include providing a sorting interface for changing a sorting criterion of the search video content displayed on the search result interface.

In one embodiment, the sorting criterion may include at least one of the degree of relevance to the search query for the at least one of the plurality of video semantic search attributes, video update date, and video playback time.

In one embodiment, responsive to receiving a detailed search attribute display input for the search video content, providing a sub-timeline view interface corresponding to a sub-attribute of a video semantic search attribute related to the search video content, wherein the sub-timeline view interface has another visual characteristic indicating a degree of relevance of the search video content with respect to the sub-attribute.

In one embodiment, the method may further include providing a keyword display area for display at least one keyword related to the sub-attribute.

In one embodiment, the keyword display area may be configured to display a plurality of keywords based on a degree of relevance of the plurality of keywords to the search query.

In one embodiment, responsive to receiving an input of selecting one of a plurality of keywords through the keyword display area, the method may further include displaying the visual characteristic indicating the degree of relevance to the selected keyword through the sub-timeline view interface.

In one embodiment, responsive to receiving an input to provide providing the search result interface in a card view mode, displaying the at least one search video content in the form of at least one card on the search result interface, wherein a playback time of the one or more search sections that are related to the search query are displayed within the at least one card.

In one embodiment, the at least one search video content may be obtained by generating one or more video retrieval vectors for the search video content, generating a search query vector for the search query, and comparing the search query vector to the one or more video retrieval vectors for the search video content.

In one embodiment, the one or more video retrieval vectors and the search query vector may be generated using a set of trained neural networks.

In one embodiment, a first search section of the search video content may be related to the search query with respect to a first video semantic search attribute and a second search section of the search video content may be related to the search query with respect to a second video semantic search attribute different from the first video semantic search attribute.

In order to implement the foregoing object, another exemplary embodiment of the present disclosure discloses a non-transitory computer readable storage medium storing a computer program. When the computer program is executed in one or more processors, the computer program causes the one or more processors to perform operations for performing a method of providing a user interface for video retrieval, the method of providing the user interface including: receiving a search query, providing a search result interface displaying at least one search video content and one or more search sections within the search video content retrieved as a result of the search query, wherein the search video content and the one or more search sections are related with the search with the search query with respect to at least one of a plurality of video semantic search attributes, and providing a timeline view interface for the search video content when providing the search result interface in a timeline view mode, wherein the timeline view interface indicates locations of one or more search sections of the search video content along a timeline of the search video content, and wherein the timeline view interface has a visual characteristic indicating a degree of relevance of the one or more search sections with respect to the at least one of the plurality of video semantic search attributes for the search query.

In order to implement the foregoing object, another exemplary embodiment of the present disclosure discloses a computing device for performing a method of providing a user interface for video retrieval. The computing device includes a processor including at least one core, and a memory including program codes executable in the processor, in which the processor receives a search query, provides a search result interface displaying at least one search video content and one or more search sections within the search video content retrieved as a result of the search query, in which the search video content and the one or more search sections are related with the search query with respect to at least one of a plurality of video semantic search attributes, and provides a timeline view interface for the search video content when providing the search result interface in a timeline view mode, wherein the timeline view interface indicates locations of one or more search sections of the search video content along a timeline of the search video content, and in which the timeline view interface has a visual characteristic indicating a degree of relevance of the one or more search sections with respect to the at least one of the video semantic search attributes for the search query.

The present disclosure may provide the method and the apparatus for providing the user interface for video retrieval.

DETAILED DESCRIPTION

Figure 1:
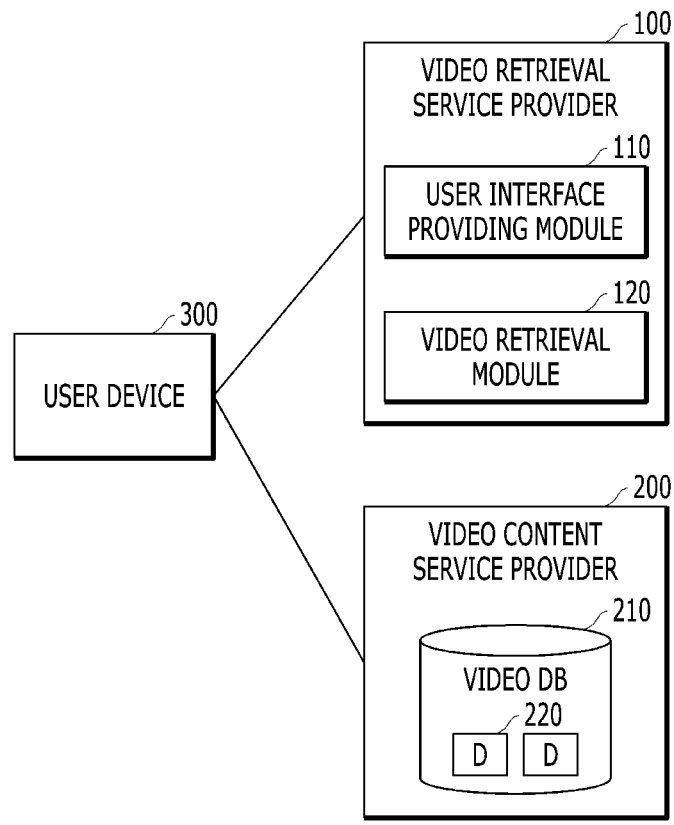
FIG. 1 is a conceptual diagram of a system for providing a video retrieval function according to some exemplary embodiments of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

It should be understood that a term "include" and/or "including" means that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, such implementation decisions should not be interpreted as causing a departure from the scope of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, a network function, an artificial neural network, and a neural network may be interchangeably used.

FIG. 1 is a conceptual diagram of a system for providing a video retrieval function according to some exemplary embodiments of the present disclosure.

In some exemplary embodiments, a video retrieval service provider 100, a video content service provider 200, and a user device 300 may be communicatively connected to each other to provide a video retrieval service to a user (not illustrated). The components of the system disclosed in FIG. 1 are just some examples of the system for providing a video retrieval function according to some exemplary embodiments of the present disclosure, and/or more or fewer components than those disclosed in FIG. 1 for providing the video retrieval function may configure a video retrieval system.

In some exemplary embodiments, the entity disclosed in FIG. 1 or modules illustrated as being included in the entity may refer to functional modules performed by a series of software codes executed by a processor. In another embodiment, an entity or modules illustrated to be included in an entity may refer to one or more processors (not illustrated) allocated to perform functions of the corresponding entity and module.

The processor may be formed of one or more cores, and may include a processor, such as a central processing unit (CPU), a general purpose graphics processing unit (GPGPU), and a tensor processing unit (TPU) of the computing device, for performing a data analysis and deep learning. The processor may read a computer program stored in the memory 130 and process data for machine learning according to some exemplary embodiments of the present disclosure. According to some exemplary embodiments of the present disclosure, the processor may perform an operation for training a neural network. The processor may perform a calculation, such as processing of input data for training in Deep Learning (DL), extraction of a feature from input data, an error calculation, and updating of a weight of the neural network by using backpropagation, for training the neural network. At least one of the CPU, GPU, and TPU of the processor may process training of the network function. For example, the CPU and the GPU may process training of the network function and data classification by using a network function together. Further, in some exemplary embodiments of the present disclosure, the training of the network function and the data classification by using a network function may be processed by using the processors of the plurality of computing devices together. Further, the computer program executed in the computing device according to some exemplary embodiments of the present disclosure may be a CPU, GPU, or TPU executable program.

The processor may perform a method of reading a computer program stored in a memory and providing a user interface for video retrieval according to some exemplary embodiments of the present disclosure. In some exemplary embodiments, the databases disclosed in FIG. 1 may be implemented by being stored in a memory. In this specification, the database may mean a logical correlation between cross-referenced data. Otherwise, the database may also mean a storage space within a memory in which data is physically stored.

According to some exemplary embodiments of the present disclosure, the memory (not illustrated) may store any type of information generated or determined by the processor and any type of information received by the network interface. For example, the memory may store video semantic search attribute information of video content for video retrieval, information for transmitting and receiving search video content corresponding to a search query, and information for providing a user interface for processing a search query, generated by the processor.

According to some exemplary embodiments of the present disclosure, the memory may be a storage medium storing computer software that causes the processor to perform operations according to the embodiments of the present disclosure. Accordingly, the memory does not mean only the module referred to as a database in FIG. 1, and may also be computer readable media for storing software code, data that is an execution target of the code, and an execution result of the code required for performing the entity and modules disclosed in FIG. 1.

According to the exemplary embodiment of the present disclosure, the memory may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device may also be operated in relation to web storage performing a storage function of the memory on the Internet. The description of the foregoing memory is merely illustrative, and the present disclosure is not limited thereto.

According to the embodiment of the present disclosure, the entities or modules illustrated in FIG. 1 may include a network unit (not illustrated) that communicates with each other by using any type of publicly known wired/wireless communication system.

The network unit may transmit/receive information processed by the processor, a user interface, and the like through communication with other terminals. For example, the network unit may provide the user interface generated by the processor to the client (for example, the user terminal). Further, the network unit may receive an external input of a user applied to the client and transmit the received external input to the processor. In this case, the processor may process operations, such as output, modification, change, and addition, of information provided through the user interface based on the external input of the user received from the network unit.

Specifically, for example, the network unit may transmit/receive various information for performing the method of providing a user interface for video retrieval according to some exemplary embodiments of the present disclosure. For example, the network unit of the video retrieval service provider 100 may receive data 220 including one or more search video content stored on the video database 210 of the video content service provider 200. Also, the network unit of the video retrieval service provider 100 or the video content service provider 200 may receive video data generated in real time by the user device 300. Further, the network may receive a search query for video retrieval. Also, the network unit may transmit/receive information for performing the video retrieval for video content stored in an external device. The network may also transmit video content information identified by the search query to other devices.

Meanwhile, computing devices and/or entities according to some exemplary embodiments of the present disclosure may include a server as a computing system that transmits and receives information through communication with a client. In this case, the client may be any type of terminal that is capable of accessing the server.

According to some exemplary embodiments, the video retrieval service provider 100 may include a user interface providing module 110 and a video retrieval module 120.

The user interface providing module 110 may provide a user interface for providing a user with a video retrieval result obtained by the video retrieval module 120 according to a search query, as described with reference to FIGS. 4 to 11.

The video retrieval module 120 may analyze the stored video, convert the video into a video semantic searchable form, and provide the converted video. The video retrieval module 120 may generate and store or provide a video retrieval vector for a video in order to convert the video into a searchable form. Specifically, the video retrieval module 120 may generate one or more video retrieval vectors for one video content. For example, the video retrieval module 120 may generate a plurality of video retrieval vectors corresponding to a plurality of video semantic search attributes for one video content. Here, the plurality of video semantic search attributes may include conversation information in a video, text information in a video, person information in a video, or visual information in a video.

The video retrieval module 120 may receive a search query for searching for information in the video through the user interface provided by the user interface providing module 110. In addition, the video retrieval module 120 may provide video information corresponding to the query received through the user interface provided by the user interface providing module 110. Here, the video information corresponding to the query includes a list of video contents corresponding to the query, a start time and/or an end time in the video contents corresponding to the query, a video corresponding to the query, the degree of matching of a partial playback section of the video with the received query, and the like. In addition, the video information corresponding to the query may include information indicating which of the plurality of video semantic search attributes is searched.

The video retrieval service provider 100 may provide the video retrieval service in the form of Software as a Service (SaaS) or in the form of an Application Programming Interface (API). As some examples, when a user accesses through the user device 300 and inputs a video search query, the video retrieval service provider 100 may provide an online service that provides video information corresponding to the video search query. As some other examples, the video retrieval service provider 100 may provide a video retrieval vector for video data stored by the video content service provider 200 or provide video information corresponding to the search query that the video content service provider 200 receives from the user device 300 through an API to which the video content service provider 200 is accessible.

The video content service provider 200 may store the video data 220 in the video database 210. The video content service provider 200 may include additional modules which are not illustrated in FIG. 1 to provide a video content service. In some examples, the video content service provider 200 may include a user interface (not illustrated) that communicates with the user device 300, or additionally include a communication module (not illustrated) for communicating with the API of the video retrieval service provider 100 and content delivery networks (not illustrated) for providing the requested video content to the user device 300.

The video database 210 of the video content service provider 200 may also be implemented in a local memory possessed by the video content service provider 200, or may be distributed and stored in a cloud storage outside the video content service provider 200.

The user device 300 may transmit the search query to the video retrieval service provider 100 or the video content service provider 200, and receive video information corresponding to the search query. For example, the user device 300 may provide the user with a user interface provided according to the method of providing a user interface for video retrieval according to some exemplary embodiments of the present disclosure. In this case, through the user device 300, the user may easily search for the corresponding information through the video semantic search even when the information that the user wants to find is stored in the form of video content.

Some entities illustrated in FIG. 1 may be integrated and implemented by a single entity according to the specific exemplary embodiment, or the functions disclosed as being implemented by the single entity in FIG. 1 may be distributed and performed across multiple entities. The modules included in the entities, respectively, illustrated in FIG. 1 may be included in other entities and perform functions according to the specific exemplary embodiment. For example, in some exemplary embodiment, the video retrieval service provider 100 may be integrated with the video content service provider 200 and one entity may provide the function of providing and retrieving the video content to the user device 300.

Figure 2:
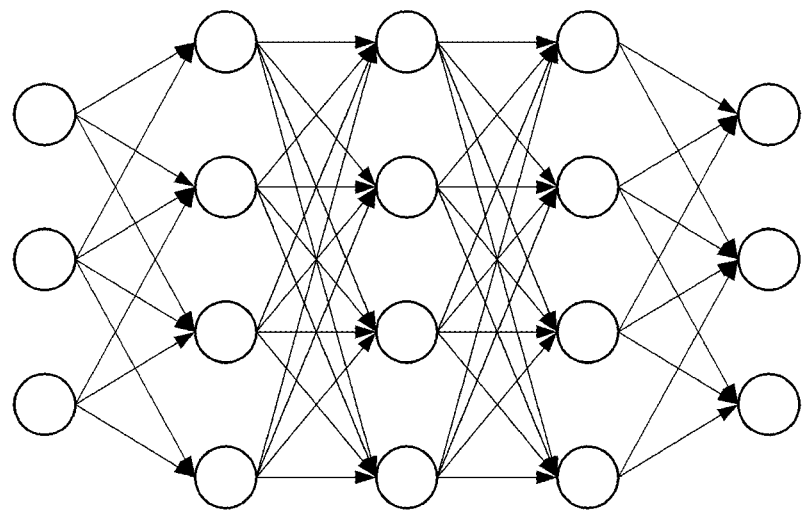
FIG. 2 is a conceptual diagram illustrating a network function according to some exemplary embodiments of the present disclosure.

FIG. 2 is a conceptual diagram illustrating a network function according to an exemplary embodiment of the present disclosure.

Throughout the present specification, the meanings of a calculation model, a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer based on distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network, a Siamese network, a transformer, and the like. The foregoing description of the deep neural network is merely illustrative, and the present disclosure is not limited thereto.

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing or reducing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 3A:
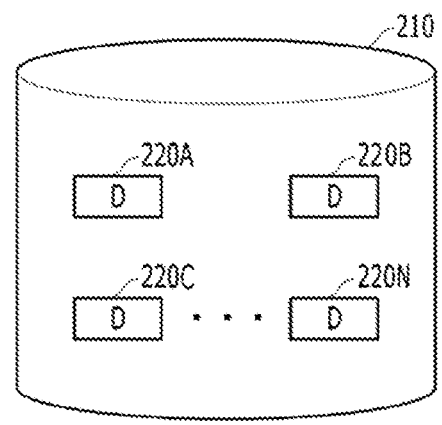
FIGS. 3A and 3B are conceptual diagrams illustrating video retrieval according to some exemplary embodiments of the present disclosure.
Figure 3B:
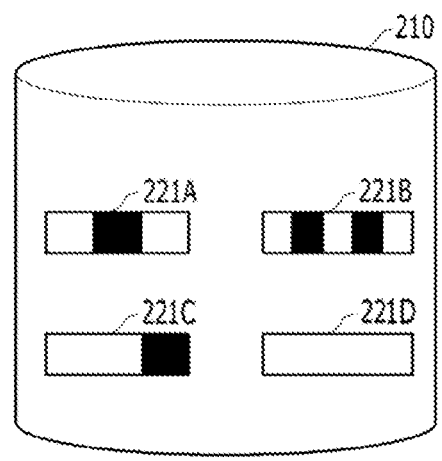

FIGS. 3A and 3B are conceptual diagrams illustrating video retrieval according to some exemplary embodiments of the present disclosure.

As illustrated in FIG. 3A, one or more video data 220A, 220B, 220C, . . . , and 220N may be stored in the video database 210. One or more video data 220A, 220B, 220C, . . . , and 220N may be provided by the video content service provider 200, may be transmitted from the user device 300, or may be received from another entity that is not illustrated in FIG. 1.

The video retrieval refers to the task of searching the video with the highest semantic relevance to the input search query among one or more videos. A video corpus moment retrieval may refer to the task of a search temporal moment with the highest or above a threshold semantic relevancy to the input search query among one or more videos. Unless otherwise indicated, the video retrieval may be used herein as a term encompassing video corpus moment search.

The video data is characterized as atypical multi-modal data including not only visual data but also non-visual data, such as audio data, text data, and semantic data according to the interaction of objects in the video. Accordingly, the video retrieval or the video corpus moment retrieval may be performed for a plurality of video semantic search attributes. For example, the video retrieval or the video corpus moment retrieval may be performed in a manner that determines similarity to a search query for conversation information in a video, text information in a video, person information in a video, or visual information in a video.

In the exemplary embodiment of the present disclosure, in order to search for the temporal moment with the highest semantic relevancy to the input query, key frames with high semantic volatility in one or more videos may be identified first. By using time information of the identified key frame (for example, information on a timestamp in which the corresponding key frame is located), one or more videos 220A, 220B, 220C, . . . , and 220N may be first segmented. In this case, when one or more videos 220A, 220B, 220C, . . . , and 220N are temporally segmented in the unit of the key frame with the high semantic volatility, each of the segmented videos is more likely to include semantically similar data across the entire video. In this case, the video retrieval vector generated by encoding the segmented videos may well represent the corresponding entire segments. Minimum unit videos suitable for performing the video corpus moment retrieval may be obtained by identifying the key frame and segmenting one or more videos based on the identified key frame. By segmenting the video based on the key frame with the high semantic volatility within the video, the segmented video is formed of semantically homogeneous video data. Accordingly, it is possible to more effectively represent the segmented video with less information (for example, fewer video retrieval vectors or smaller dimension video retrieval vector).

As illustrated in FIG. 3B, among the plurality of video retrieval vectors generated by encoding the plurality of segmented videos, one or more video retrieval vectors similar to the search query vector generated by encoding the search query may be identified. By using information about videos 221A, 221B, 221C, and 221D corresponding to the one or more identified video search query vectors, a position of the moment at which the data that is most semantically similar to the search query exists among the one or more videos and similarity may be confirmed. In this case, the data that is most semantically similar to the search query among the one or more videos may be related to a specific video semantic search attribute (for example, conversation information in the video, text information in the video, person information in the video, or visual information in the video). The data that is most semantically similar to the search query may be displayed as a search result for the search query through a user interface provided according to some exemplary embodiments of the present disclosure.

Hereinafter, a method of providing a user interface for video retrieval and an embodiment thereof will be described with reference to FIGS. 4 to 12.

Figure 4:
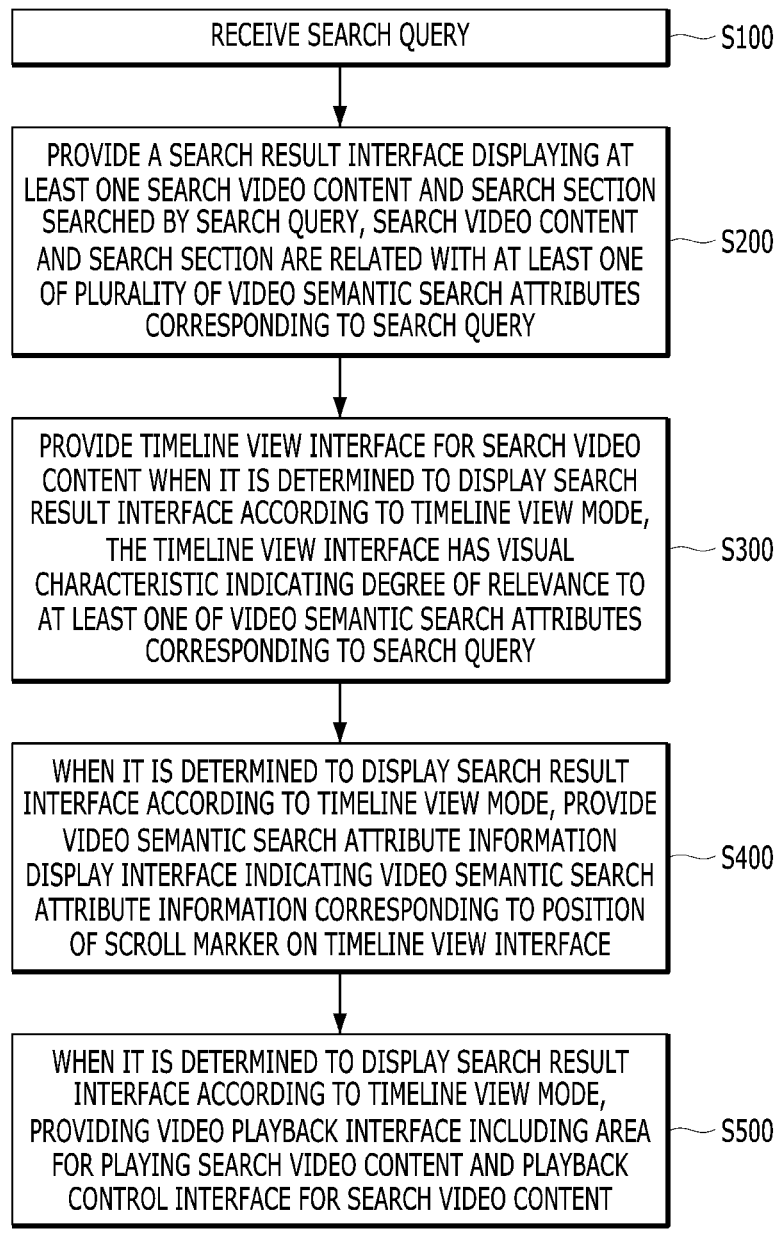
FIG. 4 is a flowchart of a method of providing a user interface for video retrieval according to some exemplary embodiments of the present disclosure.

FIG. 4 is a flowchart of a method of providing a user interface for video retrieval according to some exemplary embodiments of the present disclosure.

According to some exemplary embodiments of the present disclosure, a method of providing a user interface for video retrieval may include receiving a search query (s100).

Specifically, in some exemplary embodiments, a search query may be received from a user through the user interface providing module 110. The search query may be input through various methods. For example, the search query may be input in various types, such as text, voice, image, and video. In this case, a particular type of search query may be converted to another type to facilitate processing. For example, the search query that is a voice may be converted to text. However, the present disclosure is not limited thereto, and the search query may be input in various ways.

The received search query may be input to the video retrieval module 120. In this case, the video retrieval module 120 may perform a video retrieval for the received search query. The video retrieval module 120 may determine, based on the search query, one or more search video content corresponding to a plurality of video semantic search attributes and a moment (or play time) of the search video content. In other words, the video retrieval module 120 may determine, based on the search query, one or more search video content and one or more search sections within the search video content that are related to the search query with respect to at least one of a plurality of video semantic search attributes. For example, a first search section may be related to the search query with respect to a first video semantic search attribute and a second search section may be related to the search query with respect to a second video semantic search attribute different from the first video semantic search attribute. In another example, two or more search sections may be related to the search query with respect to the same video semantic search attribute. Here, the temporal moment (or play time) of the search video content corresponding to the search query may be referred to as a search section for convenience. The one or more search sections of a search video content may be identified to be relevant to the search query and thus may be retrieved as a result of the search query.

The video data is characterized as atypical multi-modal data including not only visual data but also non-visual data, such as audio data, text data, and semantic data according to the interaction of objects in the video. A multi-modal data characteristic used for video semantic search may be referred to as a video semantic search attribute for convenience. Here, the plurality of video semantic search attributes may include at least one conversation information in the video, text information in the video, person information in the video, or visual information in the video. For example, the video retrieval module 120 may determine a search video content corresponding to the search query and a search section of the search video content based on the conversation information in the video. As another example, the video retrieval module 120 may determine a search video content corresponding to the search query and a search section of the search video content based on the person information in the video. However, the present disclosure is not limited thereto, and the video retrieval module 120 may generate a search result by using various video characteristics.

According to some exemplary embodiments of the present disclosure, the method of providing the user interface for video retrieval may include providing a search result interface that displays at least one search video content and the search section searched for by the search query (s200). Here, the search video content and the search section may be related to at least one of the plurality of video semantic search attributes corresponding to the search query.

As described above, the video retrieval module 120 may determine a search video content and a search section on the search video content for each of the plurality of video semantic search attributes. In this case, the user interface providing module 110 may provide a search result interface that displays the search video content and search section searched by the search query. For example, the search result interface may display a list of video content that corresponds to the search query, a start time and/or an end time (playback duration) within the video content corresponding to the search query, the degree to which the video corresponding to the search query and a partial playback section match the search query, corresponding video semantic search attributes between the search query and the video data, and the like.

Since the video retrieval module 120 performs the video retrieval for a plurality of video semantic search attributes, the search video content and the search section may be related to any one of the plurality of video semantic search attributes. For example, when the plurality of video semantic search attributes include conversation information in the video, text information in the video, the person information in the video, and visual information in the video, the search video content and the search section may be content searched in relation to any one of the conversation information in the video, the text information in the video, the person information in the video, and the visual information in the video. In this case, the user interface providing module 110 may display which video semantic search attribute is related to the search video content (and/or search section) through the search result interface. However, the present disclosure is not limited thereto, and the user interface providing module 110 may display various search results through the search result interface.

According to some exemplary embodiments of the present disclosure, the method of providing the user interface for video retrieval may include, when it is determined to display the search result interface according to a timeline view mode, providing a timeline view interface for the search video content (s300). Here, the timeline view interface may have a visual characteristic indicating a degree of relevance to at least one of the plurality of video semantic search attributes corresponding to the search query.

The search result interface may have various display modes for displaying the search result. For example, the search result interface may have a card view mode and a timeline view mode, but is not limited thereto. The display mode of the search result interface may be determined by various methods. For example, the search result interface may be preset to display the search result in a specific display mode at an initial time point at which the search result is displayed. As another example, after the search result interface is provided according to a preset display mode, a user input for changing the display mode may be received. In this case, the search result interface may be controlled to be displayed in the input display mode.

In some exemplary embodiments, when the display mode is preset as the timeline view mode or a user input to change the display mode to the timeline view mode is received, the user interface providing module 110 may determine to display the search result interface according to the timeline view mode. In this case, the user interface providing module 110 may provide a timeline view interface for the search video content.

The timeline view interface may display a timeline view of video content. In this case, the timeline view interface may display the playback time corresponding to the search section on the timeline. The timeline view interface may have a visual characteristic indicating a degree of relevance to the video semantic search attribute. For example, the timeline view interface may display a search section to have a different color and/or brightness according to the degree of relevance to the video semantic search attribute. For example, a search section having high relevance to the video semantic search attribute may be displayed in a lighter color, and a search section having low relevance to the video semantic search attribute may be displayed in a darker color. Accordingly, the present disclosure may provide the user interface through which a user is capable of easily recognizing the degree of relevance between the search section and the video semantic search attribute through a visual characteristic, such as a difference in color brightness.

In some exemplary embodiments, the visual characteristics indicative of the degree of relevance to the video semantic search attribute may include various characteristics. For example, the visual characteristic may include a characteristic of a color, a sign, or text, or a combination thereof indicating the degree of relevance. In some examples, as described above, when the visual characteristic is a characteristic of a color, the degree of relevance may be displayed by varying the brightness of the color. In another example, when the visual characteristic is a sign, the degree of relevance may be displayed by changing the type or size of the sign. In another example, when the visual characteristic is text, the degree of relevance may be displayed by a numerical value. In another example, the degree of relevance may be displayed by displaying a numerical value simultaneously while varying the brightness of a color. However, the present disclosure is not limited thereto, and the degree of relevance to the video semantic search attribute may be displayed by using various visual characteristics.

The user interface providing module 110 may provide other interfaces together with the timeline view interface in the timeline view mode as described below in order to easily display the search result.

According to some exemplary embodiments of the present disclosure, the method of providing the user interface for video retrieval may include, when it is decided to display the search result interface according to the timeline view mode, providing a search attribute information display interface indicating video semantic search attribute information corresponding to a position of a scroll marker on the timeline view interface (S400).

Specifically, the user interface providing module 110 may provide a search attribute information display interface indicating video semantic search attribute information corresponding to the position of the scroll marker on the timeline view interface. For example, the search attribute information display interface may include at least one of a video semantic search thumbnail display area, a video semantic search type display area, and a video semantic search content display area.

The video semantic search thumbnail display area may display a video thumbnail of a corresponding search section indicated by a scroll marker. The video semantic search type display area may display video semantic search attributes related to the corresponding search section. For example, for the search query "Gary's Guitar Solo", when the search video content and the search section including the person "Gary Moore" are identified by the person information in the video, the video semantic search type display area may display the "person information in the video". The video semantic search content display area may display specific voice, text, person, visual information, and the like of the video semantic search attribute related to the search query. For example, for the search query "Gary's Guitar Solo", when the search video content and the search section including the person "Gary Moore" are identified by the person information in the video, the video semantic search content display area may display "Gary Moore". However, the present disclosure is not limited thereto, and the search attribute information display interface may be configured in various ways.

In some exemplary embodiments, when a plurality of search sections exists in one search video content, the user may move the scroll mark displayed on the timeline view interface from the currently selected search section to another search section in order to select a search section. In this case, the search attribute information display interface may display information on the search section corresponding to the position to which the scroll mark is newly moved. Accordingly, the user may easily obtain video content information for the plurality of search sections.

According to some exemplary embodiments of the present disclosure, the method of providing the user interface for video retrieval may include, when it is decided to display the search result interface according to the timeline view mode, providing a video playback interface including a playback area for playing the search video content and a playback control interface for the search video content (S500).

More specifically, the user interface providing module 110 may provide a video playback interface for playing and controlling the playback of the search video content so that the video content displayed as the search result can be played. The video playback interface may include a playback area for playing the search video content. In addition, the video playback interface may include a playback control interface of the search video content. The video playback interface may provide a function for the user to check the search result by directly playing the searched search video content and search section.

According to some exemplary embodiments of the present disclosure, the method of providing the user interface for video retrieval may include providing a filtering setting interface for the search video content, and when a filtering input for selecting at least one of the plurality of video semantic search attributes is received through the filtering setting interface, displaying the search video content related to the selected video semantic search attribute on the search result interface.

As described above, since the video retrieval module 120 performs a video retrieval for a plurality of video semantic search attributes, the search video content and the search section may be related to any one of the plurality of video semantic search attributes. In this case, the user interface providing module 110 may receive a filtering input for displaying only the search video content related to the video semantic search attribute desired by the user through the filtering setting interface. For example, the user interface providing module 110 may receive an input of clicking any one of the plurality of video semantic search attribute icons displayed on the filtering setting interface as a filtering input. Specifically, for example, when the user interface providing module 110 receives a filtering input for selecting an icon for 'conversation information in the video' on the filtering setting interface, only the search video content related to 'conversation information in the video' may be displayed on the search result interface. Accordingly, a user interface through which a user is capable of easily searching for search video content for each of a plurality of video semantic search attributes may be provided.

According to some exemplary embodiments of the present disclosure, the method of providing the user interface for video retrieval may include providing a sorting interface for changing a sort criterion of the search video content displayed on the search result interface. Here, the sorting criterion may include at least one of the degree of relevance, a video update date, and a video playback time.

The user interface providing module 110 may receive, through the sorting interface, an input for the user to change the sorting criterion of the search video content displayed on the search result interface through the sorting interface. In some exemplary embodiments, the sort criterion may include the degree of relevance to the video semantic search attribute, the video update date, the video playback time, and the like. For example, when the user interface providing module 110 receives an input for selecting the degree of relevance through the sorting interface, the search video content displayed on the search result interface may be sorted according to the degree of relevance.

According to some exemplary embodiments of the present disclosure, the method of providing the user interface for video retrieval may include, when a detailed search attribute display input for the search video content is received, additionally providing a sub-timeline view interface corresponding to a sub-attribute of the video semantic search attribute related to the search video content. Here, the sub-timeline view interface may have a visual characteristic indicating the degree of relevance to the sub-attribute.

Specifically, each of the plurality of video semantic search attributes may include sub-attributes for detailed classification. For example, the visual information within the video among the plurality of video semantic search attributes may include sub-attributes, such as motion information, place information, and object information. As another example, the person information in the video among the plurality of video semantic search attributes may include information about person illustrated in the search video content as a sub-attribute. However, the present disclosure is not limited thereto, and the sub-attributes may vary.

The sub-timeline view interface may display a timeline view of video content corresponding to the sub-attribute. Similar to the timeline view interface, the sub-timeline view interface may display the playback time corresponding to the search section of the sub-attribute on the timeline. When the video semantic search attribute has a plurality of sub-attributes, there may be a plurality of sub-timeline view interfaces. For example, when the visual information in the video has three sub-attributes, such as motion information, place information, and object information, the sub-timeline view interface corresponding to the sub-attribute of the visual information in the video may be composed of three sub-timeline view interfaces related to the motion information, the place information, and the object information, respectively. Similar to the timeline view interface, the sub-timeline view interface may have a visual characteristic indicating the degree of relevance to the sub-attribute. For example, the sub-timeline view interface may display the search section to have different colors and/or brightness according to the degree of relevance to the sub-attribute. In some examples, the search section having high relevance to the sub-attribute may be displayed in a lighter color, and a search section having low relevance to the sub-attribute may be displayed in a darker color. Accordingly, the present disclosure may provide the user interface through which a user is capable of easily recognizing the degree of relevance between the search section and the sub-attribute through the visual characteristic, such as a difference in color brightness.

Similar to the visual characteristic indicating the degree of relevance to the video semantic search attribute, the visual characteristic indicating the degree of relevance to the sub-attribute may include various characteristics. For example, the visual characteristic indicating the degree of relevance to the sub-attribute may include a characteristic of a color, a sign, or text, or a combination thereof indicating the degree of relevance. In some examples, as described above, when the visual characteristic is a characteristic of a color, the degree of relevance may be displayed by varying the brightness of the color. In another example, when the visual characteristic is a sign, the degree of relevance may be displayed by changing the type or size of the sign. In another example, when the visual characteristic is text, the degree of relevance may be displayed by a numerical value. In another example, the degree of relevance may be displayed by displaying a numerical value simultaneously while varying the brightness of a color. However, the present disclosure is not limited thereto, and the degree of relevance to the sub-attribute may be displayed by using various visual characteristics.

The detailed search attribute display input for calling the sub-timeline view interface may include various user input methods. For example, the detailed search attribute display input may be a user input of clicking a detailed search attribute display icon provided on an area related to the search video content. In some examples, when a user input of clicking the detailed search attribute display icon indicated as 'Visual Detail' on an area in which the search video content is displayed is received, the user interface providing module 110 may provide a sub-timeline view interface corresponding to a sub-attribute of visual information in the video. As another example, in some examples, when a user input clicking the detailed search attribute display icon indicated as 'People Detail' is received, the user interface providing module 110 may provide a sub-timeline view interface corresponding to a sub-attribute of person information in the video. However, the present disclosure is not limited thereto, and the detailed search attribute display input may include various user input methods.

According to some exemplary embodiments of the present disclosure, the method of providing the user interface for video retrieval may further include, in the case of additionally providing the sub-timeline view interface corresponding to the sub-attribute of the video semantic search attribute related to the search video content, providing a keyword display area for displaying at least one keyword related to the sub-attribute.

Specifically, when the sub-timeline view interface is additionally provided, the keyword display area may be provided together. The keyword display area may be an area in which the keywords related to the sub-attribute is displayed. For example, the sub-timeline view interface may have a keyword display area under the sub-timeline view. In some examples, the sub-timeline view interface corresponding to the plurality of sub-attributes may have a keyword display area under the timeline view for each sub-attribute. For example, the sub-timeline view interface corresponding to the sub-attribute consisting of motion information, place information, and object information may include a keyword display area where keywords for motion information are displayed under the timeline view interface for the motion information, a keyword display area where keywords for place information are displayed under the timeline view interface for the place information, and a keyword display area where keywords for object information are displayed under the timeline view interface for the object information. However, the present disclosure is not limited thereto, and the keyword display area may be provided in various ways.

According to some exemplary embodiments of the present disclosure, the keyword display area may display a plurality of keywords based on the degree of relevance to the search query.

More specifically, when the plurality of keywords is displayed in the keyword display area, the order or display method in which the plurality of keywords is displayed in the keyword display area may be determined according to the degree of relevance to the search query. For example, in the keyword display area, the plurality of keywords may be arranged from left to right in the order of high relevance. Specifically, for example, among the two keywords displayed in the keyword display area, the keyword located on the left may have a higher degree of relevance to the search query than the keyword located on the right. As another example, the keyword display area may display a plurality of keywords in different sizes according to an order of high relevance. Specifically, for example, a keyword having a high degree of relevance among the plurality of keywords displayed in the keyword display area may be displayed larger than a keyword having a low degree of relevance. However, the present disclosure is not limited thereto, and the keyword display area may display a plurality of keywords in various ways based on the degree of relevance to the search query.

According to some exemplary embodiments of the present disclosure, the method of providing the user interface for video retrieval may include, when an input for selecting one of the plurality of keywords through the keyword display area is received, displaying a visual characteristic indicating the degree of relevance to the selected keyword through the sub-timeline view interface.

Specifically, for example, the plurality of keywords may be displayed on the keyword display area displayed under the timeline view. When a user input for selecting one of the plurality of keywords is received, the sub-timeline view interface may display a visual characteristic indicating the degree of relevance to the selected keyword. For example, when two keywords ('driving' and 'steering')' are displayed in the keyword display area, the user interface providing module 110 may receive a user input for selecting the keyword 'driving'. Here, an exemplary user input may be an input of clicking on the keyword 'driving' among the two keywords displayed on the sub-timeline view interface. In this case, the sub-timeline view interface may display a visual characteristic indicating the degree of relevance to the keyword 'driving'. As another example, when a user input for simultaneously selecting two or more keywords from among the plurality of keywords is received, the sub-timeline view interface may display a visual characteristic indicating the degree of relevance to the two or more keywords. However, the present disclosure is not limited thereto, and the sub-timeline view interface may display visual characteristics indicating the degree of relevance to the selected keyword in various ways.

According to some exemplary embodiments of the present disclosure, the sub-timeline view interface may provide a function similar to the timeline view interface. For example, when an input for positioning a scroll marker on the sub-timeline view interface is received, similar to the search attribute information display interface, the sub-timeline view interface may provide an area in which thumbnails and time codes corresponding to the positions of the scroll markers are displayed on the sub-timeline view interface. In addition, when an input for positioning a scroll marker on the sub-timeline view interface is received, the video playback interface may play the search video content corresponding to the position of the scroll marker. However, the present disclosure is not limited thereto, and the sub-timeline view interface may provide various functions similar to the timeline view interface.

The method of providing the user interface for video retrieval according to the present disclosure may provide a user interface for providing a user with a video retrieval result obtained according to a video retrieval according to a search query. Specifically, the method of providing the user interface according to the present disclosure may provide a user interface having a visual characteristic through which a user is capable of easily recognizing the degree of relevance to a plurality of video semantic search attributes. Also, the method of providing the user interface according to the present disclosure may provide a user interface through which a search result obtained according to the plurality of video semantic search attributes may be easily checked.

Each operation of the method of providing the user interface for video retrieval described above is presented for explanation only, and some operations may be omitted or separate operations may be added. In addition, the operations of the method of providing the user interface for video retrieval described above may be performed according to an arbitrary order.

Hereinafter, an embodiment of a user interface according to some exemplary embodiments of the present disclosure will be described with reference to FIGS. 5 to 12.

Figure 5:
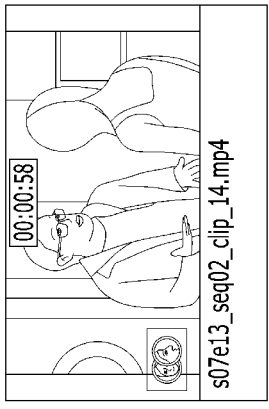
FIG. 5 is a diagram illustrating an example of displaying a user interface for receiving a search query according to some exemplary embodiments of the present disclosure.

FIG. 5 is a diagram illustrating an example of displaying a user interface for receiving a search query according to some exemplary embodiments of the present disclosure.

Referring to FIG. 5, the user interface providing module 110 may provide a search query input interface 1000 for inputting a search query. In the exemplary embodiment illustrated in FIG. 5, the search query may be the text 'Gary driving'. As described above, the search query may be input in various types, such as text, voice, image, and video. The search query received through the search query input interface 1000 may be input to the video retrieval module 120. In this case, the video retrieval module 120 may perform a video retrieval for the received search query. Specifically, the video retrieval module 120 may determine search video content and a search section on the search video content for each of the plurality of video semantic search attributes. Such search results may be provided to the user through a search results interface as described below.

Figure 6:
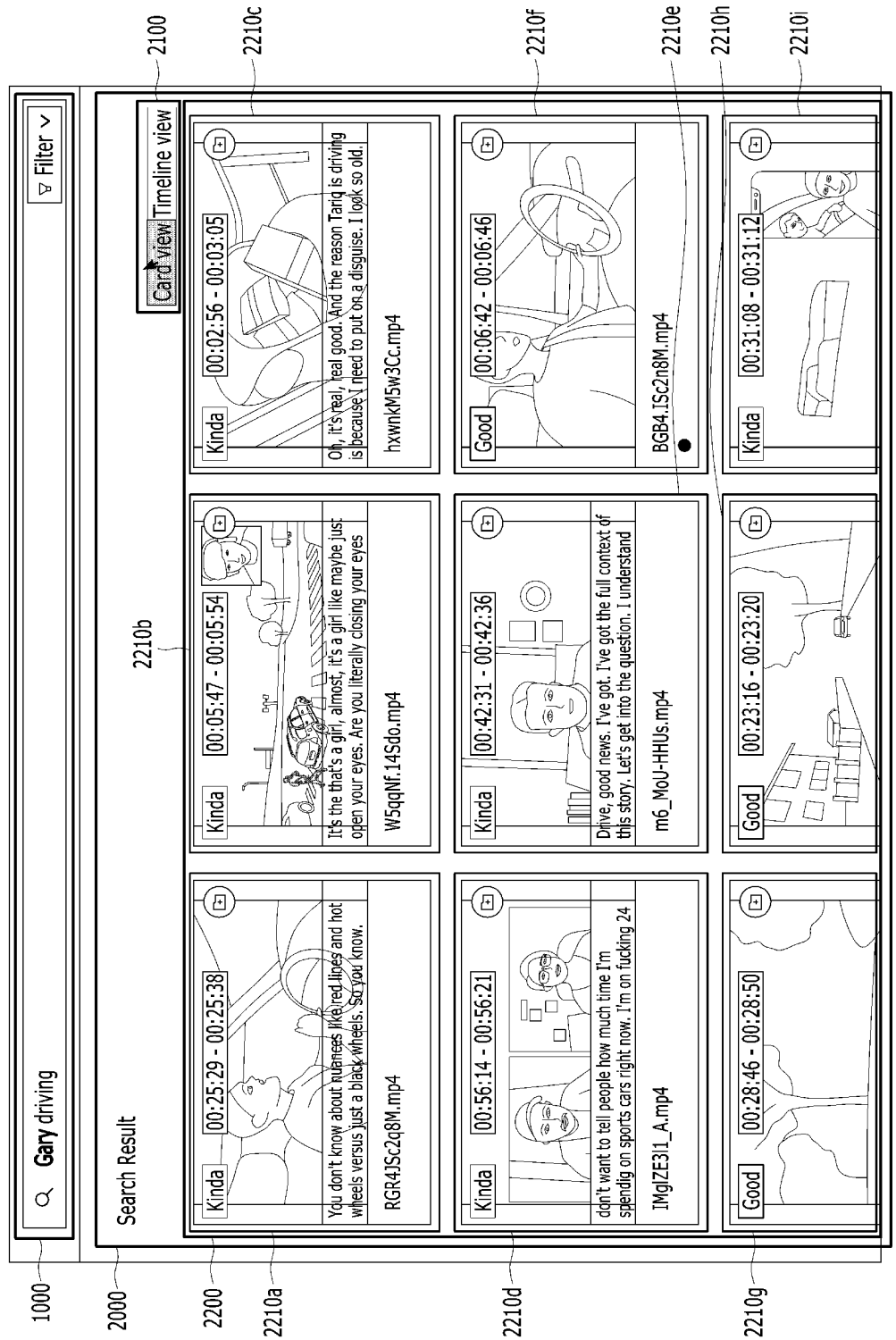
FIG. 6 is a diagram illustrating an example of displaying a search result interface in a card view mode according to some exemplary embodiments of the present disclosure.

FIG. 6 is a diagram illustrating an example of displaying a search result interface 2000 in a card view mode according to some exemplary embodiments of the present disclosure.

The user interface providing module 110 may provide a search result interface 2000 that displays search video content 2210a to 2210i and search sections searched by the search query. When the search result interface 2000 is preset to the card view mode 2200, as illustrated in FIG. 6, the search result interface 2000 may display the search video content and the search section according to the card view mode 2200. Referring to FIG. 6, in the card view mode 2200, the search section may be displayed as text indicating a playback time.

In this case, the user interface providing module 110 may receive a user input for changing the display mode to the timeline view mode through a view selection interface 2100. When a user input for changing the display mode to the timeline view mode is received, the user interface providing module 110 may determine to display the search result interface 2000 according to the timeline view mode as described below.

Figure 7:
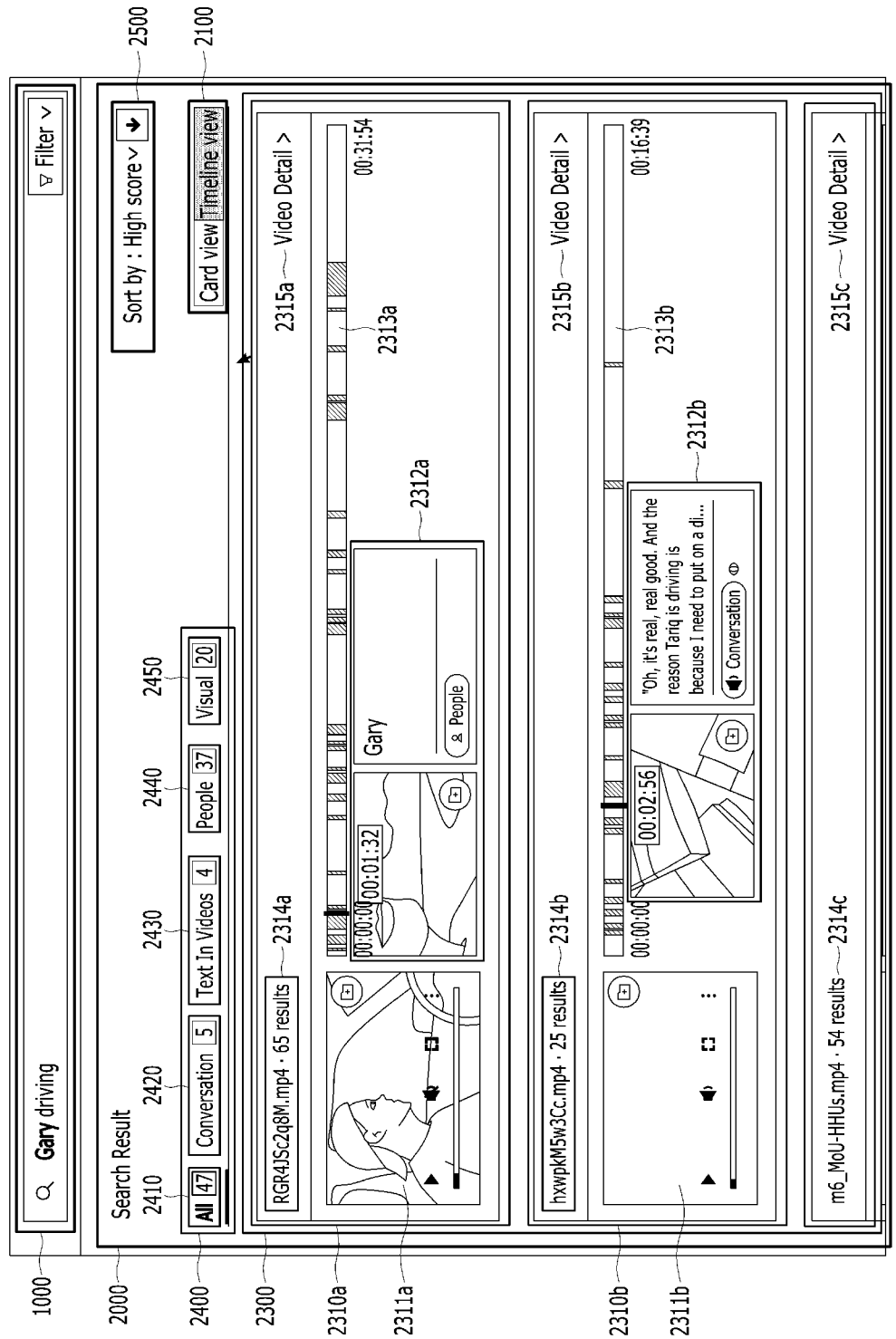
FIG. 7 is a diagram illustrating an example of displaying a search result interface in a timeline view mode according to some exemplary embodiments of the present disclosure.

FIG. 7 is a diagram illustrating an example of displaying a search result interface 2000 in the timeline view mode according to some exemplary embodiments of the present disclosure.

As described in FIG. 6, when a user input for changing the display mode to the timeline view mode 2300 is received, the user interface providing module 110 may determine to display the search result interface 2000 according to the timeline view mode 2300. As another example, when the search result interface 2000 is preset to the timeline view mode 2300, the user interface providing module 110 may determine to display the search result interface 2000 according to the timeline view mode 2300.

When it is determined to display the search result interface according to the timeline view mode 2300, the user interface providing module 110 may provide the timeline view interfaces 2313a and 2313b for the search video contents 2310a and 2310b. The timeline view interface may indicate name of the video 2314a for search video content 2310a and 65 relevant search sections identified for the search video content 2310a, and name of the video 2314b for search video content 2310b and 25 relevant search sections identified for the search video content 2310b. The timeline view interface may indicate locations of one or more relevant search sections along a timeline of the search video content. The timeline view interface may have a visual characteristic indicating the degree of relevance to at least one of the plurality of video semantic search attributes corresponding to the search query. Referring to FIG. 7, the timeline view interface 2313a may display search sections with different brightness according to the relevance of the search query 'Gary driving' to 'Gary', which is 'person information in the video'. Also, referring to FIG. 7, the timeline view interface 2313b may display search sections with different brightness according to the degree of relevance of the search query 'Gary driving' to 'conversation information in the video'. Specifically, the search section indicated with a relatively bright color may have the high degree of relevance to the search query, and the search section indicated with a relatively dark color may have the low degree of relevance to the search query. Accordingly, according to some exemplary embodiments of the present disclosure, there may be provided the user interface through which a user is capable of easily recognizing relevance to a plurality of search semantic search attributes during the video retrieval.

The user interface providing module 110 may provide an additional interface together with the timeline view interface in the timeline view mode in order to easily deliver the search result to the user. Referring to FIG. 7, the user interface providing module 110 may provide search attribute information display interfaces 2312a and 2312b indicating video semantic search attribute information corresponding to the position of the scroll marker on the timeline view interfaces 2313a and 2313b. In some exemplary embodiments, the search attribute information display interfaces 2312a and 2312b may include at least one of a video semantic search thumbnail display area, a video semantic search type display area, and a video semantic search content display area. As illustrated in FIG. 7, the search attribute information display interface 2312a may display a video thumbnail corresponding to the position of the scroll marker on the timeline view interface 2313a on the video semantic search thumbnail display area. Also, the search attribute information display interface 2312a may display a 'people' icon indicating "the video semantic search attribute is information on person in the video" on the video semantic search type display area. Also, the search attribute information display interface 2312a may display text indicating that the search video content 2310a is related to the person "Gary" by the person information in the video on the video semantic search content display area. Accordingly, during the video retrieval, a user interface through which the user is capable of easily recognizing information on the video semantic search attribute related to the search video content may be provided.

Referring back to FIG. 7, the user interface providing module 110 provides video playback interfaces 2311a and 2311b including a playback area for playing the search video content and a playback control interface for the search video content 2310a and 2310b. Accordingly, the user interface through which the user is capable of easily checking the search result by directly playing the searched search video content and search section by using the video playback interface may be provided.

Figure 8:
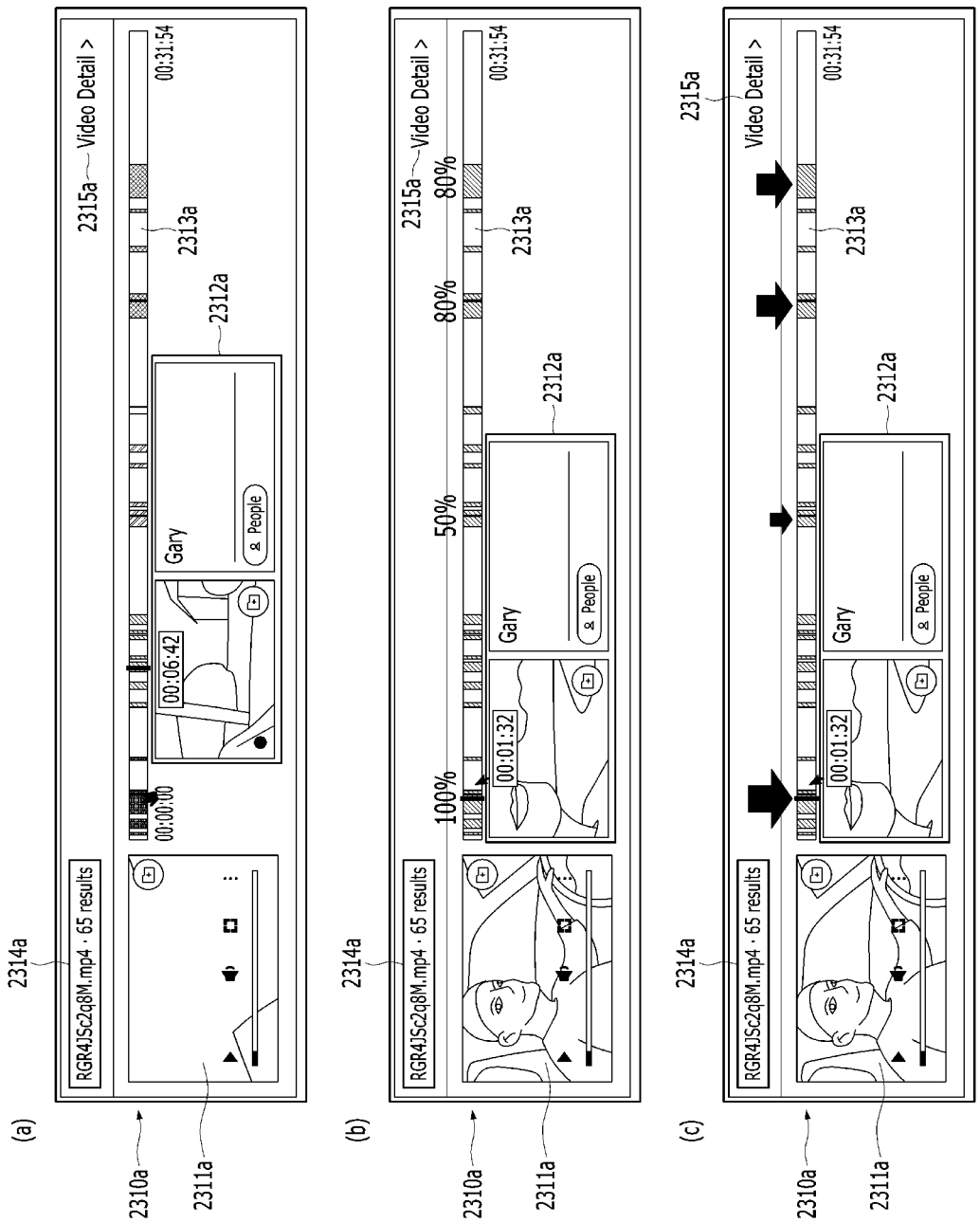
FIG. 8 is a diagram illustrating an example of displaying a timeline view interface having various visual characteristics indicating a degree of relevance to a video semantic search attribute according to some exemplary embodiments of the present disclosure.

FIG. 8 is a diagram illustrating an example of displaying the timeline view interface having various visual characteristics indicating the degree of relevance to the video semantic search attribute according to some exemplary embodiments of the present disclosure.

The visual characteristic indicating the degree of relevance to the video semantic search attribute may include various characteristics. For example, the visual characteristic may include a characteristic of a color, a sign, or text, or a combination thereof indicating the degree of relevance.

Referring to (a) of FIG. 8, a timeline view interface 2312a in which a visual characteristic is a color characteristic is illustrated. In this case, the timeline view interface 2312a may display the degree of relevance of the search section by varying the brightness of the color. For example, a search section displayed with a relatively light color may have high relevance to a search query, and a search section displayed with a relatively dark color may have a low relevance to the search query.

Referring to (b) of FIG. 8, a timeline view interface 2312a in which a visual characteristic is text is illustrated. The timeline view interface 2312a may display the degree of relevance by displaying a percentage value indicating the degree of relevance on the search section.

Referring to (c) of FIG. 8, a timeline view interface 2312a in which a visual characteristic is a sign is illustrated. The timeline view interface 2312a may display the degree of relevance by displaying a sign indicating the degree of relevance on the search section. For example, the search section displayed with a relatively large sign may have high relevance to the search query, and a search section displayed with a relatively small sign may have low relevance to the search query.

Figure 9:
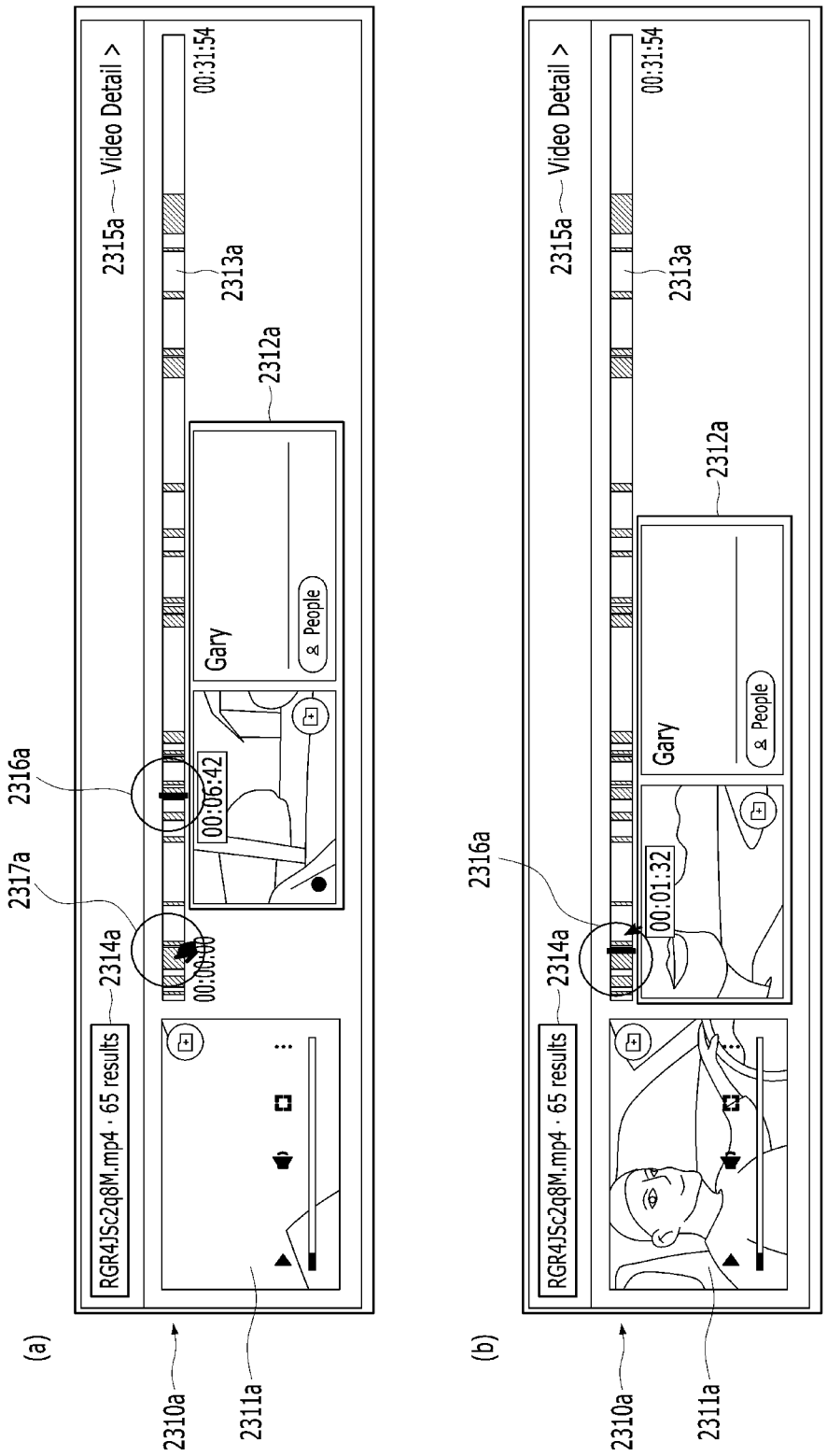
FIG. 9 is a diagram illustrating an example of a search attribute information display interface according to some exemplary embodiments of the present disclosure.

FIG. 9 is a diagram illustrating an example of a search attribute information display interface according to some exemplary embodiments of the present disclosure.

The user interface providing module 110 may provide a search attribute information display interface 2312a displaying video semantic search attribute information corresponding to a position of a scroll marker 2316a on the timeline view interface 2313a. When a plurality of search sections exists on the search video content, the user interface providing module 110 may receive a user input for moving a scroll mark from the currently selected search section to another search section through the timeline view interface 2313a. Referring to FIG. 9, when the position of the scroll mark 2316a illustrated in (a) of FIG. 9 is moved to the position of the scroll mark 2316a illustrated in (b) of FIG. 9, the search attribute information display interface 2312a may display information on a search section corresponding to the position of the scroll mark 2316a illustrated in (b) of FIG. 9. Accordingly, the user interface through which a user is capable of easily obtaining video content information for a plurality of search sections may be provided.

Figure 10A:
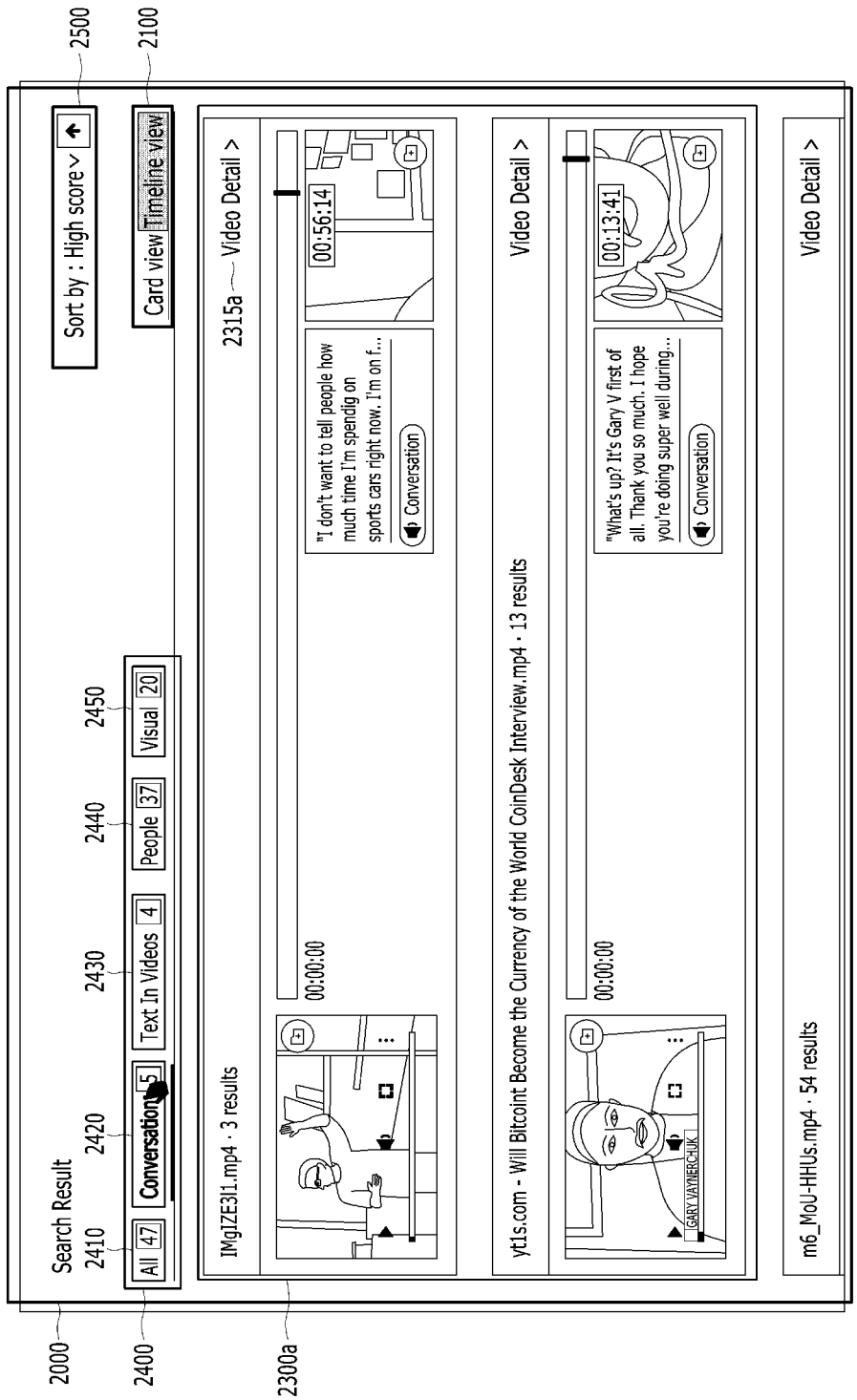
FIGS. 10A-10B are diagrams illustrating an example of a filtering setting interface according to some exemplary embodiments of the present disclosure.
Figure 10B:
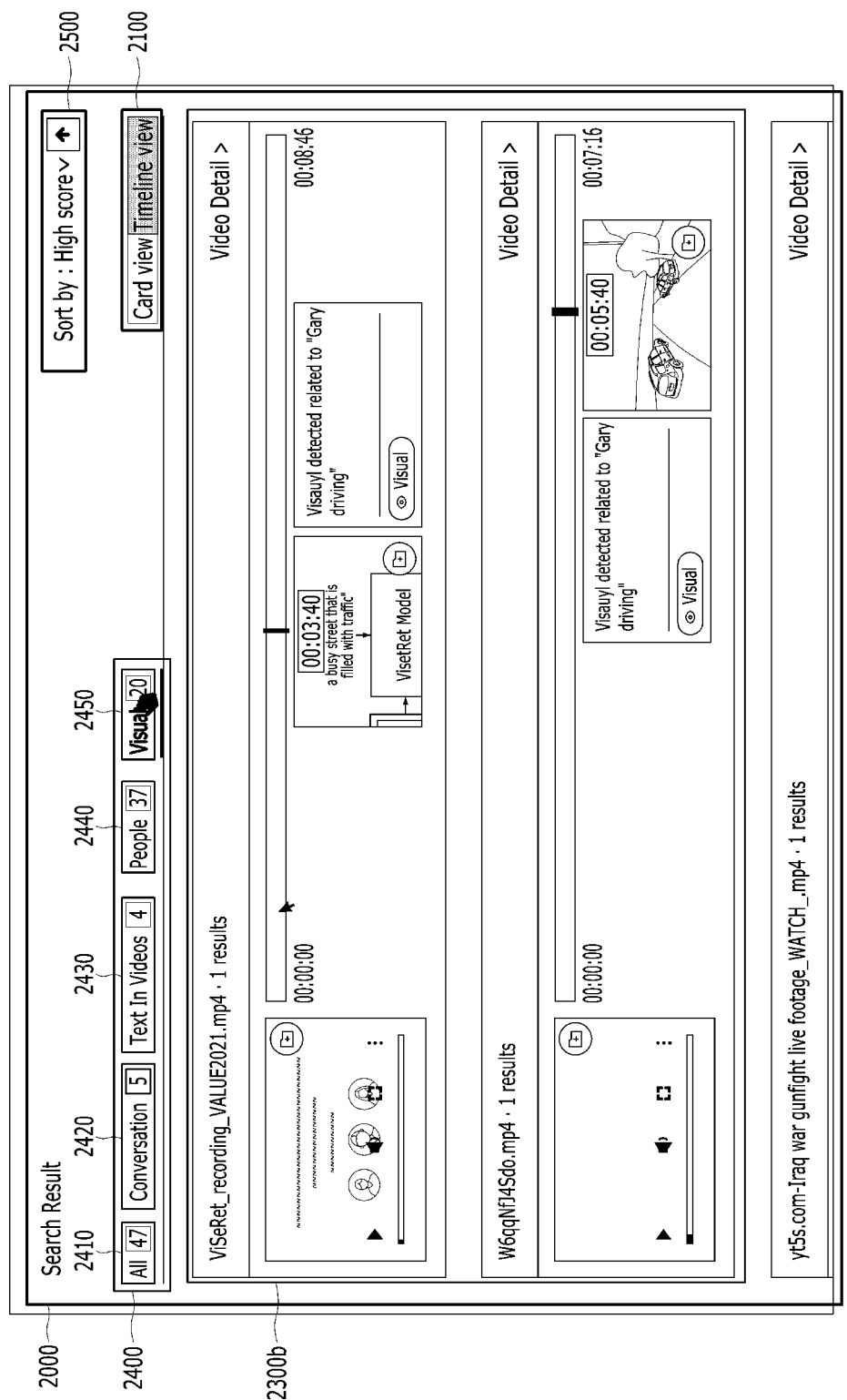

FIGS. 10A-10B are diagrams illustrating an example of the filtering setting interface according to some exemplary embodiments of the present disclosure.

The user interface providing module 110 may provide a filtering setting interface 2400 for search video content. The filtering setting interface 2400 may receive a filtering input for selecting at least one of a plurality of video semantic search attributes. For example, the user interface providing module 110 may receive a filtering input of clicking any one of the plurality of video semantic search attribute icons 2410, 2420, 2430, 2440, and 2450 displayed on the filtering setting interface. Referring to FIG. 10A, the filtering setting interface 2400 displays a state in which 'conversation information in video' is selected as a filtering condition. In this case, as illustrated in FIG. 10A, only the search video content related to 'conversation information in video' may be displayed on the search result interface 2000. Referring to FIG. 10B, the filtering setting interface 2400 displays a state in which 'visual information in video' is selected as a filtering condition. In this case, as illustrated in FIG. 10B, only the search video content related to 'visual information in video' may be displayed on the search result interface 2000. Accordingly, a user interface through which a user is capable of easily searching for search video content for each of a plurality of video semantic search attributes may be provided.

Figure 11:
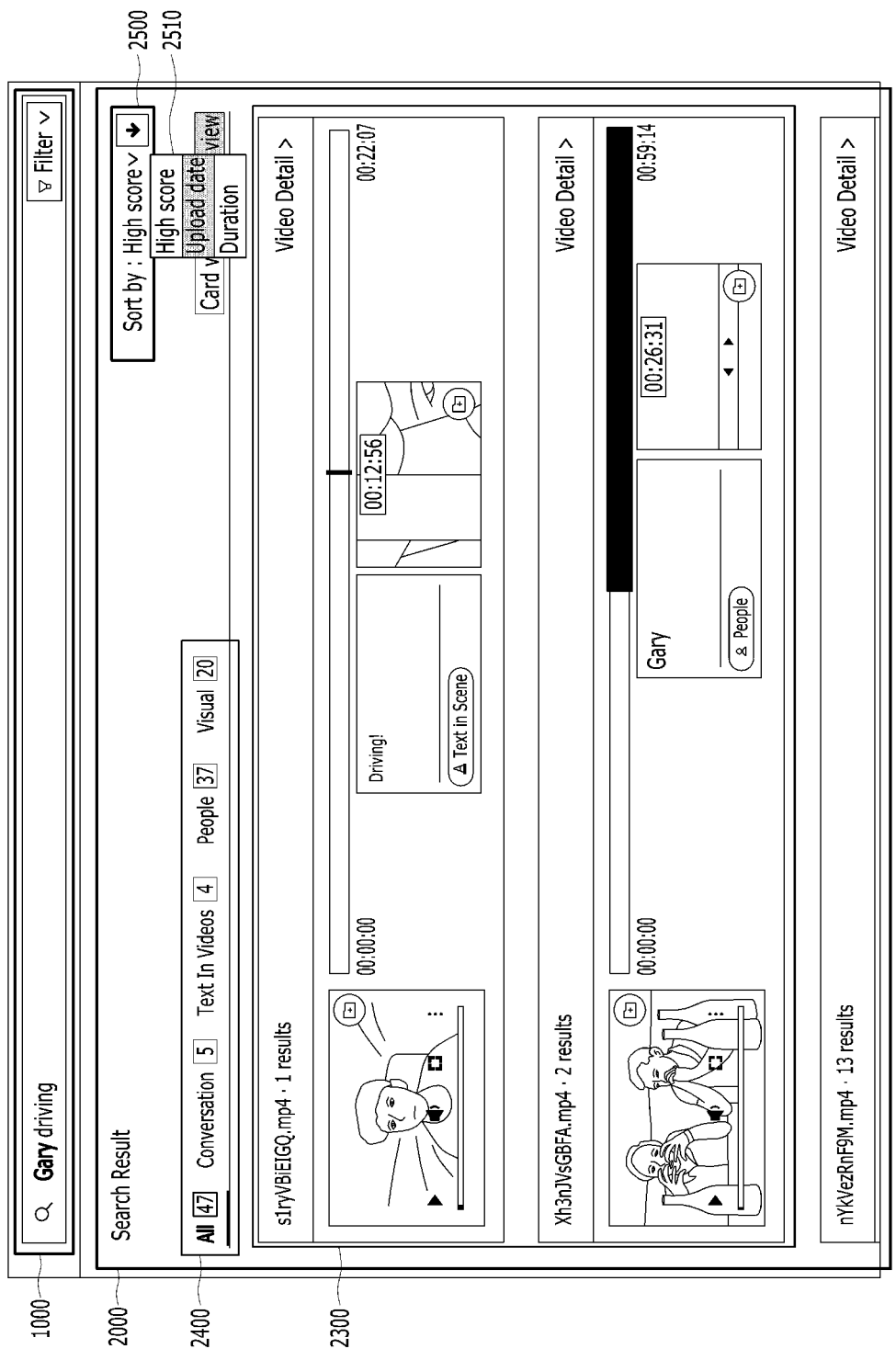
FIG. 11 is a diagram illustrating an example of a sorting interface according to some exemplary embodiments of the present disclosure.

FIG. 11 is a diagram illustrating an example of the sorting interface according to some exemplary embodiments of the present disclosure.

Referring to FIG. 11, the user interface providing module 110 may provide a sorting interface 2500 for changing a sorting criterion of search video content displayed on the search result interface 2000. In some exemplary embodiments, the sort criteria may include at least one of the degree of relevance, video update date, and video playback time.

The sorting interface 2500 may receive an input for changing the sorting criterion of the search video content displayed on the search result interface 2000. For example, when a cursor moves on the sorting interface 2500, a sorting criterion selection window 2510 through which the sorting criteria including the degree of relevance to the video semantic search attribute, the video update date, and the video playback time are selected may be displayed. When one of the sorting criteria is selected by the user, the user interface providing module 110 may sort the search video contents displayed on the search result interface 2000 according to the selected sorting criterion. For example, when the user interface providing module 110 receives an input for selecting the degree of relevance through the sorting interface 2500, the search video content displayed on the search result interface 2000 may be sorted according to the degree of relevance.

Figure 12A:
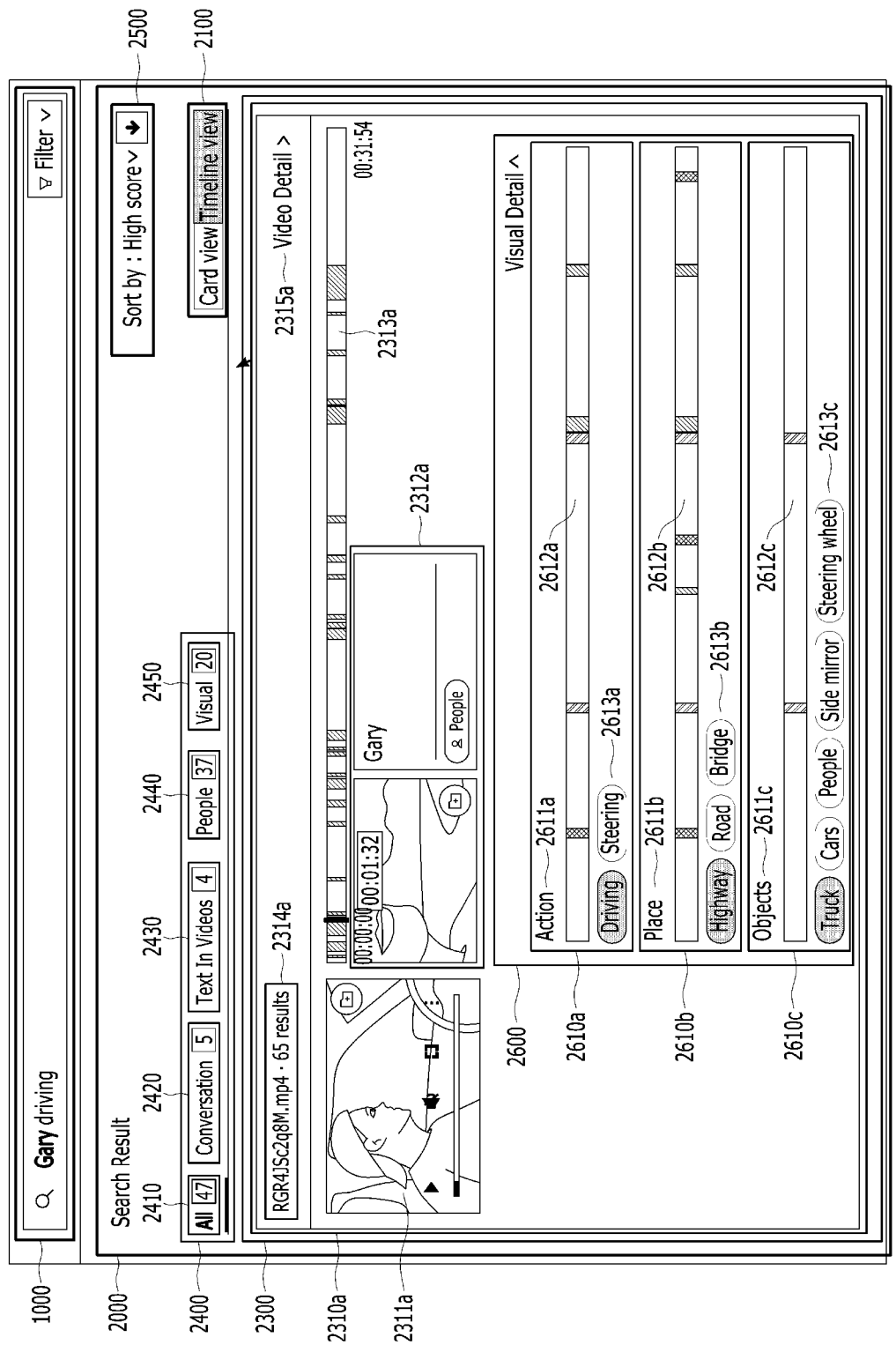
FIGS. 12A-12C are diagrams illustrating an example of a sub-timeline view interface according to some exemplary embodiments of the present disclosure.
Figure 12B:
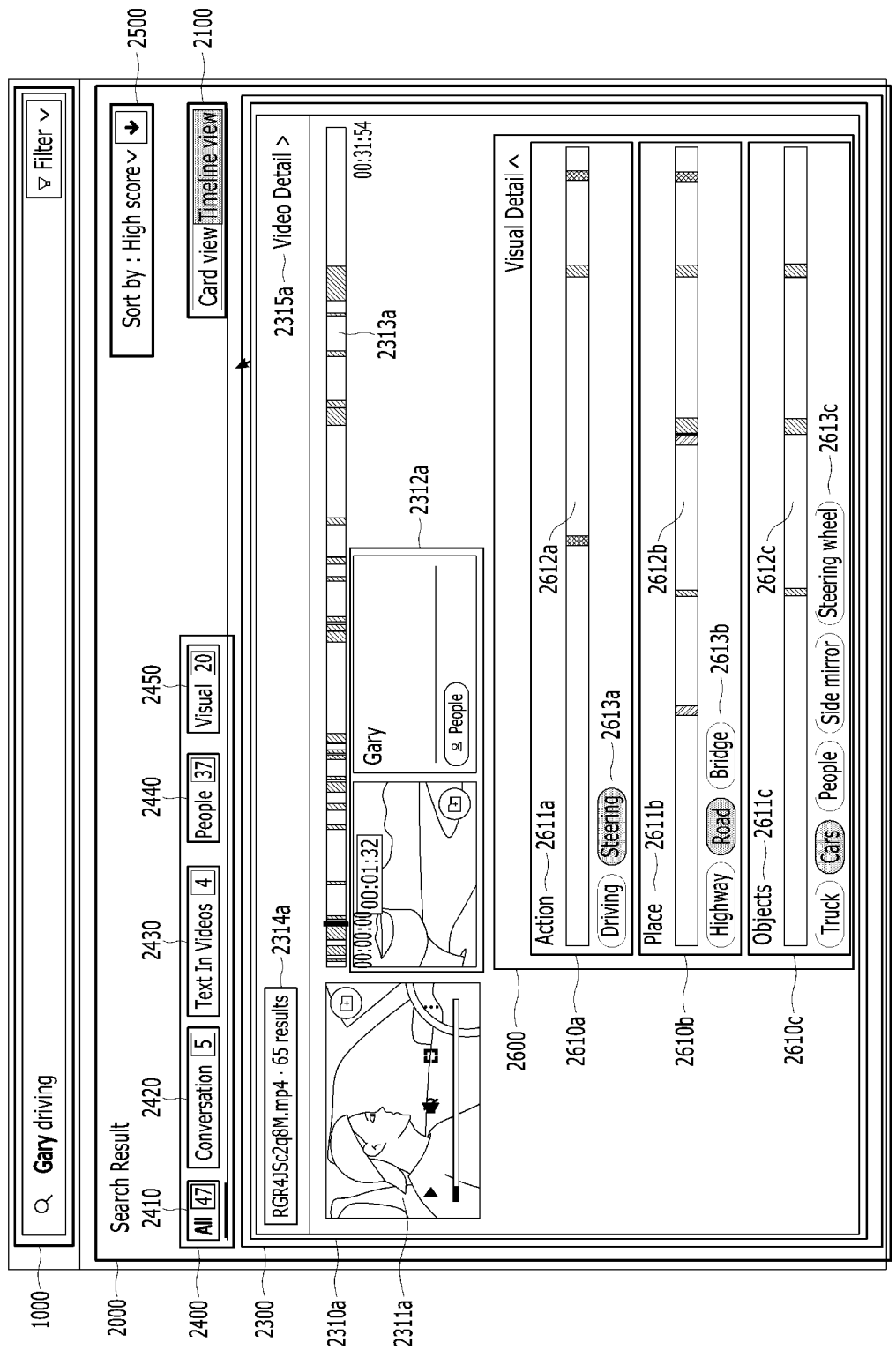
Figure 12C:
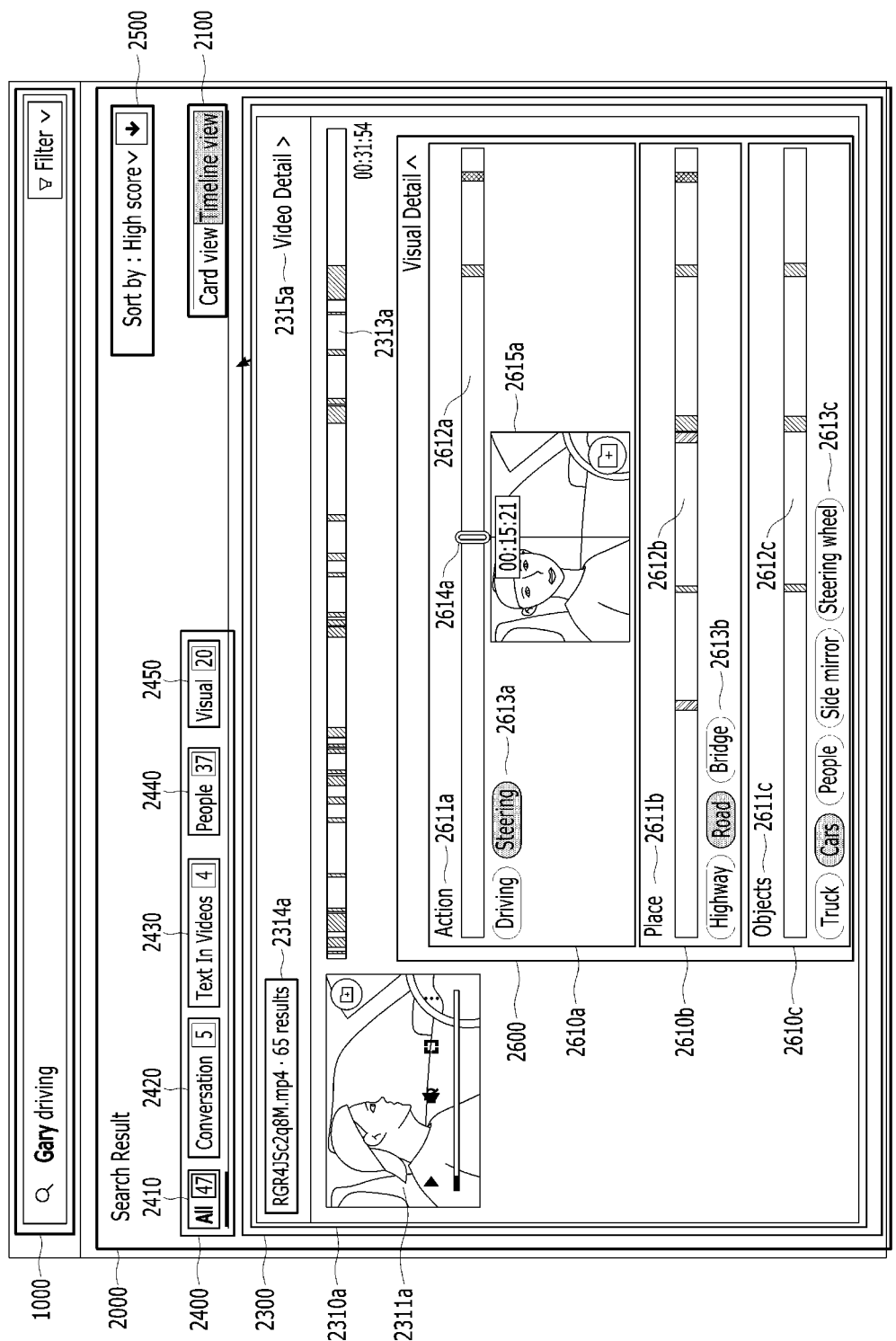

FIGS. 12A-12C are diagrams illustrating an example of the sub-timeline view interface according to some exemplary embodiments of the present disclosure.

The user interface providing module 110 may additionally provide sub-timeline view interfaces 2612a, 2612b, and 2612c corresponding to the sub-attribute of the video semantic search attribute related to the search video content 2310a. Referring to FIG. 12A, through a user input of clicking a detailed search attribute display icon displayed as 'Visual Detail' on the sub-attribute display area 2600 related to the search video content 2310a, sub-timeline view interfaces 2612a, 2612b, and 2612c corresponding to three sub-attributes of the visual information in the video may be displayed in a drop-down manner Here, the sub-attribute display area 2600 is displayed in the form of a box recognizable by a user for easy explanation, but the sub-attribute display area 2600 may not be an area displayed to the user.

In some examples, as illustrated in FIG. 12B, the sub-attribute of the visual information in the video may include three types of information (motion or action information, place information, object information). In this case, the sub-timeline view interface may be composed of three sub-timeline view interfaces 2612a, 2612b, and 2612c corresponding to each sub-attribute. The sub-timeline view interface may display a timeline view of the search video content 2310a in response to the sub-attribute. Similar to the timeline view interface 2313a, the sub-timeline view interfaces 2612a, 2612b, and 2612c corresponding to each sub-attribute may display the playback time corresponding to the search section of the sub-attribute by using visual characteristics. The visual characteristic may include a color characteristic, a sign, or text indicating the degree of relevance. Thus, the sub-timeline view interfaces 2612a, 2612b, and 2612c may display another visual characteristic that indicates a degree of relevance of the search video content (e.g., search sections of the search video content) with respect to one or more sub-attributes for an attribute.

When the sub-timeline view interface is additionally provided, a keyword display area may be provided together. The keyword display area may be an area in which the keywords related to the sub-attribute is displayed. Referring to FIG. 12A, the sub-timeline view interface corresponding to a sub-attribute including motion or action information, place information, and object information may include a first keyword display area 2613a in which a keyword for the motion information is displayed under the sub-timeline view interface 2612a for the motion information, a second keyword display area 2613b in which a keyword for the place information is displayed under the sub-timeline view interface 2612b for the place information, and a third keyword display area 2613c in which a keyword for the object information is displayed under the sub-timeline view interface 2612c for the object information.

In some examples, when there are a plurality of keywords displayed in the keyword display area, the order or display method in which the plurality of keywords is displayed in the keyword display area may be determined according to the degree of relevance to the search query. Referring to FIG. 12A, in the keyword display area, the plurality of keywords may be arranged from left to right in the order of high relevance. For example, on the first keyword display area 2613a in which a keyword for motion information is displayed, the keyword 'Driving' located on the left has a higher degree of relevance to the search query than the keyword 'Steering' located on the right.

When an input for selecting one of a plurality of keywords through the keyword display area is received, the user interface providing module 110 may display a visual characteristic indicating the degree of relevance to the selected keyword through the sub-timeline view interface. Referring to FIG. 12B, when a user input for selecting the keyword 'Steering' on the first keyword display area 2613a in which a keyword for motion or action information is displayed is received, the sub-timeline view interface 2610a corresponding to the motion information may display the playback time corresponding to the search section of the selected keyword 'Steering' on the timeline. Similarly, compared with FIG. 12A, FIG. 12B illustrates the example in which each of the sub-timeline view interface 2610b for place information and the sub-timeline view interface 2610c for object information displays the playback time corresponding to the search section of the selected keyword.

The sub-timeline view interface may provide a function similar to that of the timeline view interface 2313a. For example, referring to FIG. 12C, when an input for locating a scroll marker 2614a on the sub-timeline view interface 2612a is received, similar to the search attribute information display interface, the sub-timeline view interface 2612a may provide an area 2615a in which a thumbnail and a time code corresponding to the position of the scroll marker 2614a are displayed. In addition, when an input for positioning the scroll marker 2614a on the sub-timeline view interface 2600 is received, a video playback interface 2311a may play the search video content corresponding to the position of the scroll marker 2614a.

Figure 13:
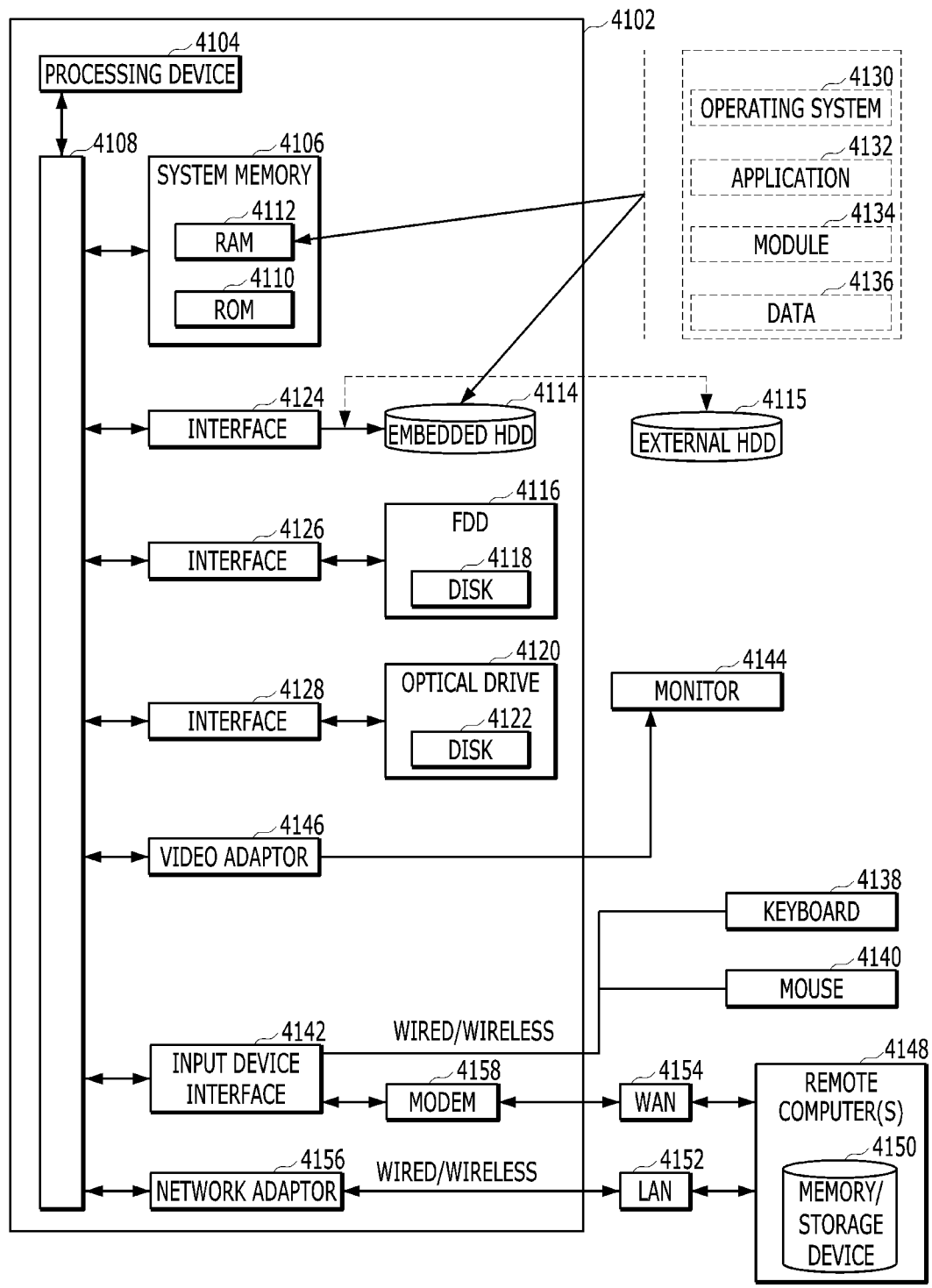
FIG. 13 is a simple and general schematic diagram illustrating an example of a computing environment in which the exemplary embodiments of the present disclosure are implementable.

FIG. 13 is a general schematic diagram illustrating an example of a computing environment in which the exemplary embodiments of the present disclosure contents are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 4100 including a computer 4102 and implementing several aspects of the present disclosure is illustrated, and the computer 4102 includes a processing device 4104, a system memory 4106, and a system bus 4108. The system bus 4108 connects system components including the system memory 4106 (not limited) to the processing device 4104. The processing device 4104 may be a predetermined processor among various commonly used processors. A dual processor and other multiprocessor architectures may also be used as the processing device 4104.

The system bus 4108 may be a predetermined one among several types of bus structure, which may be additionally connectable to a local bus using a predetermined one among a memory bus, a peripheral device bus, and various common bus architectures. The system memory 4106 includes a ROM 4110, and a RAM 4112. A basic input/output system (BIOS) is stored in a non-volatile memory 4110, such as a ROM, an erasable and programmable ROM (EPROM), and an EEPROM, and the BIOS includes a basic routine helping a transport of information among the constituent elements within the computer 4102 at a time, such as starting. The RAM 4112 may also include a high-rate RAM, such as a static RAM, for caching data.

The computer 4102 also includes an embedded hard disk drive (HDD) 4114 (for example, enhanced integrated drive electronics (EIDE) and serial advanced technology attachment (SATA))—the embedded HDD 4114 being configured for exterior mounted usage within a proper chassis (not illustrated)—a magnetic floppy disk drive (FDD) 4116 (for example, which is for reading data from a portable diskette 4118 or recording data in the portable diskette 4118), and an optical disk drive 4120 (for example, which is for reading a CD-ROM disk 4122, or reading data from other high-capacity optical media, such as a DVD, or recording data in the high-capacity optical media). A hard disk drive 4114, a magnetic disk drive 4116, and an optical disk drive 4120 may be connected to a system bus 4108 by a hard disk drive interface 4124, a magnetic disk drive interface 4126, and an optical drive interface 4128, respectively. An interface 4124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 4102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 4130, one or more application programs 4132, other program modules 4134, and program data 4136 may be stored in the drive and the RAM 4112. An entirety or a part of the operation system, the application, the module, and/or data may also be cached in the RAM 4112. It will be well appreciated that the present disclosure may be implemented by several commercially usable operation systems or a combination of operation systems.

A user may input a command and information to the computer 4102 through one or more wired/wireless input devices, for example, a keyboard 4138 and a pointing device, such as a mouse 4140. Other input devices (not illustrated) may be a microphone, an IR remote controller, a joystick, a game pad, a stylus pen, a touch screen, and the like. The foregoing and other input devices are frequently connected to the processing device 4104 through an input device interface 4142 connected to the system bus 4108, but may be connected by other interfaces, such as a parallel port, an IEEE 1394 serial port, a game port, a USB port, an IR interface, and other interfaces.

A monitor 4144 or other types of display devices are also connected to the system bus 4108 through an interface, such as a video adaptor 4146. In addition to the monitor 4144, the computer generally includes other peripheral output devices (not illustrated), such as a speaker and a printer.

The computer 4102 may be operated in a networked environment by using a logical connection to one or more remote computers, such as remote computer(s) 4148, through wired and/or wireless communication. The remote computer(s) 4148 may be a work station, a computing device computer, a router, a personal computer, a portable computer, a microprocessor-based entertainment device, a peer device, and other general network nodes, and generally includes some or an entirety of the constituent elements described for the computer 4102, but only a memory storage device 4150 is illustrated for simplicity. The illustrated logical connection includes a wired/wireless connection to a local area network (LAN) 4152 and/or a larger network, for example, a wide area network (WAN) 4154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 4102 is used in the LAN networking environment, the computer 4102 is connected to the local network 4152 through a wired and/or wireless communication network interface or an adaptor 4156. The adaptor 4156 may make wired or wireless communication to the LAN 4152 easy, and the LAN 4152 also includes a wireless access point installed therein for the communication with the wireless adaptor 4156. When the computer 4102 is used in the WAN networking environment, the computer 4102 may include a modem 4158, is connected to a communication computing device on a WAN 4154, or includes other means setting communication through the WAN 4154 via the Internet. The modem 4158, which may be an embedded or outer-mounted and wired or wireless device, is connected to the system bus 4108 through a serial port interface 4142. In the networked environment, the program modules described for the computer 4102 or some of the program modules may be stored in a remote memory/storage device 4150. The illustrated network connection is illustrative, and those skilled in the art will appreciate well that other means setting a communication link between the computers may be used.

The computer 4102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

In the meantime, according to an exemplary embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements.

A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of pieces of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include data pre-processed by the processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may also include all or a predetermined combination of preprocessed data for processing by the neural network, data input to the neural network, a weight of the neural network, a hyper-parameter of the neural network, data obtained from the neural network, an active function associated with each node or layer of the neural network, and a loss function for training of the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons". The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network. (in the present specification, weights and parameters may be used with the same meaning.) Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Therefore, the present disclosure is not limited to the exemplary embodiments presented herein, and shall be interpreted in the broadest range consistent with the principles and the new characteristics presented herein.

What is claimed is:

1. A method of providing a user interface for video retrieval performed by a computing device, the method comprising:
   receiving a search query;
   providing a search result interface displaying at least one search video content and one or more search sections within the search video content retrieved as a result of the search query, wherein the search video content and the one or more search sections are related with the search query with respect to at least one of a plurality of video semantic search attributes; and
   providing a timeline view interface for the search video content when providing the search result interface in a timeline view mode, wherein the timeline view interface indicates locations of the one or more search sections of the search video content along a timeline of the search video content;
   presenting at least two or more visual characteristics displayed along the timeline of the search video content, the two or more visual characteristics indicating at least two degrees of relevance for respective search sections of the one or more search sections with respect to the at least one of the plurality of video semantic search attributes for the search query; and
   responsive to receiving a search attribute display input for the search video content, providing a sub-timeline view interface corresponding to a sub-attribute of a video semantic search attribute related to the search video content, wherein the sub-timeline view interface has another visual characteristic indicating a degree of relevance of the search video content with respect to the sub-attribute.

2. The method of claim 1, wherein the plurality of video semantic search attributes includes at least one of conversation information in a video, text information in a video, person information in a video, and visual information in a video.

3. The method of claim 1, wherein the two or more visual characteristics includes color characteristics indicating the at least two degrees of relevance.

4. The method of claim 1, wherein the two or more visual characteristics includes at least one of a color characteristic, a sign, or text indicating the at least two degrees of relevance.

5. The method of claim 1, further comprising:
providing a search attribute information display interface indicating video semantic search attribute information corresponding to a position of a scroll marker on the timeline view interface.

6. The method of claim 5, wherein the search attribute information display interface includes at least one of a video semantic search thumbnail display area, a video semantic search type display area, and a video semantic search content display area.

7. The method of claim 1, further comprising:
providing a video playback interface including a playback area for playing the search video content and a playback control interface for the search video content.

8. The method of claim 1, further comprising:
providing a filtering setting interface for the search video content; and
responsive to receiving a filtering input for selecting at least one of the plurality of video semantic search attributes through the filtering setting interface, displaying the search video content related to the selected video semantic search attribute on the search result interface.

9. The method of claim 1, further comprising:
providing a sorting interface for changing a sorting criterion of the search video content displayed on the search result interface.

10. The method of claim 9, wherein the sorting criterion includes at least one of the degree of relevance to the search query for the at least one of the plurality of video semantic search attributes, video update date, and video playback time.

11. The method of claim 1, further comprising:
providing a keyword display area for displaying at least one keyword related to the sub-attribute.

12. The method of claim 11, wherein the keyword display area is configured to display a plurality of keywords based on a degree of relevance of the plurality of keywords to the search query.

13. The method of claim 11, comprising:
responsive to receiving an input of selecting one of a plurality of keywords through the keyword display area, displaying the visual characteristic indicating the degree of relevance to the selected keyword through the sub-timeline view interface.

14. The method of claim 1, further comprising:
responsive to receiving an input to provide providing the search result interface in a card view mode, displaying the at least one search video content in the form of at least one card on the search result interface, wherein a playback time of the one or more search sections that are related to the search query are displayed within the at least one card.

15. The method of claim 1, wherein the at least one search video content is obtained by generating one or more video retrieval vectors for the search video content, generating a search query vector for the search query, and comparing the search query vector to the one or more video retrieval vectors for the search video content.

16. The method of claim 15, wherein the one or more video retrieval vectors and the search query vector are generated using a set of trained neural networks.

17. The method of claim 1, wherein a first search section of the search video content is related to the search query with respect to a first video semantic search attribute and a second search section of the search video content is related to the search query with respect to a second video semantic search attribute different from the first video semantic search attribute.

18. A non-transitory computer-readable storage medium storing a computer program, in which when the computer program is executed in one or more processors, the computer program causes the one or more processors to perform operations for performing a method of providing a user interface for video retrieval, the method of providing the user interface comprising:
receiving a search query;
providing a search result interface displaying at least one search video content and one or more search sections within the search video content retrieved as a result of the search query, wherein the search video content and the one or more search sections are related with the search query with respect to at least one of a plurality of video semantic search attributes; and
providing a timeline view interface for the search video content when providing the search result interface in a timeline view mode, wherein the timeline view interface indicates locations of the one or more search sections of the search video content along a timeline of the search video content;
presenting at least two or more visual characteristics displayed along the timeline of the search video content, the two or more visual characteristics indicating at least two degrees of relevance for respective search sections of the one or more search sections with respect to the at least one of the plurality of video semantic search attributes for the search query; and
responsive to receiving a search attribute display input for the search video content, providing a sub-timeline view interface corresponding to a sub-attribute of a video semantic search attribute related to the search video content, wherein the sub-timeline view interface has another visual characteristic indicating a degree of relevance of the search video content with respect to the sub-attribute.

19. A computing device for performing a method of providing a user interface for video retrieval, the computing device comprising:
a processor including at least one core; and
a memory including program codes executable in the processor, wherein the processor:
receives a search query,
provides a search result interface displaying at least one search video content and one or more search sections within the search video content retrieved as a result of the search query, wherein the search video content and the one or more search sections are related with the search query with respect to at least one of a plurality of video semantic search attributes, and
providing a timeline view interface for the search video content when providing the search result interface in a timeline view mode, wherein the timeline view interface indicates locations of the one or more search sections of the search video content along a timeline of the search video content;
presenting at least two or more visual characteristics displayed along the timeline of the search video content, the two or more visual characteristics indicating at least two degrees of relevance for respective search sections of the one or more search sections with respect to the at least one of the plurality of video semantic search attributes for the search query; and responsive to receiving a search attribute display input for the search video content, provide a sub-timeline view interface corresponding to a sub-attribute of a video semantic search attribute related to the search video content, wherein the sub-timeline view interface has another visual characteristic indicating a degree of relevance of the search video content with respect to the sub-attribute.

* * * * *